United States Patent
Li et al.

(10) Patent No.: US 10,250,457 B2
(45) Date of Patent: Apr. 2, 2019

(54) NETWORK NODE AVAILABILITY PREDICTION BASED ON PAST HISTORY DATA

(71) Applicant: Convida Wireless, LLC, Wilmington, DE (US)

(72) Inventors: Xu Li, Plainsboro, NJ (US); Guang Lu, Ontario (CA); Lijun Dong, San Diego, CA (US); Dale N. Seed, Allentown, PA (US); Hongkun Li, Malvern, PA (US); William Robert Flynn, IV, Schwenksville, PA (US); Phillip Brown, Los Angeles, CA (US); Catalina M. Mladin, Hatboro, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

(21) Appl. No.: 15/322,852

(22) PCT Filed: Jun. 30, 2015

(86) PCT No.: PCT/US2015/038503
§ 371 (c)(1),
(2) Date: Dec. 29, 2016

(87) PCT Pub. No.: WO2016/004011
PCT Pub. Date: Jan. 7, 2016

(65) Prior Publication Data
US 2018/0159746 A1    Jun. 7, 2018

Related U.S. Application Data

(60) Provisional application No. 62/018,941, filed on Jun. 30, 2014.

(51) Int. Cl.
*H04W 4/70* (2018.01)
*H04L 12/24* (2006.01)
(Continued)

(52) U.S. Cl.
CPC ........ *H04L 41/5016* (2013.01); *H04L 41/147* (2013.01); *H04L 43/04* (2013.01);
(Continued)

(58) Field of Classification Search
CPC ........ H04W 4/70; H04W 84/12; H04L 41/147
See application file for complete search history.

(56) References Cited

U.S. PATENT DOCUMENTS

2005/0091369 A1    4/2005    Jones
2007/0037609 A1*   2/2007    Zhang ............... H04W 52/0232
                                                          455/574
(Continued)

FOREIGN PATENT DOCUMENTS

JP    08-331275 A    12/1996
JP    2003-296274 A  10/2003
(Continued)

OTHER PUBLICATIONS

Gu, L. and Stankovic, J., "Radio-Triggered Wake-up for Wireless Sensor Networks", Real-Time system, 2005, vol. 29, 157-182.
(Continued)

*Primary Examiner* — Chi Ho A Lee
(74) *Attorney, Agent, or Firm* — BakerHostetler

(57) ABSTRACT

A node availability estimation service can be used at a service layer of an M2M/IoT network. Value-added services can leverage this node availability information to improve the operation intelligence, quality of service, communication overhead as well as energy efficiency for M2M/IoT systems. A Real-time Data Collection (DC) component can collect real-time data from input sources at service layer (e.g., other existing CSFs). A Data Processing for Estimating Node Availability component (DP) can execute data processing for estimating node availability based on the data collected by DC. A Node Availability Service Provisioning
(Continued)

component (SP) can store the estimated node availability results from DP and expose them to service clients in terms of "node availability estimation services".

20 Claims, 39 Drawing Sheets

(51) Int. Cl.
*H04L 12/26* (2006.01)
*H04L 29/08* (2006.01)

(52) U.S. Cl.
CPC ........... *H04L 43/0817* (2013.01); *H04W 4/70* (2018.02); *H04L 67/125* (2013.01); *H04L 67/16* (2013.01); *Y02D 70/142* (2018.01); *Y02D 70/144* (2018.01); *Y02D 70/162* (2018.01); *Y02D 70/164* (2018.01); *Y02D 70/21* (2018.01); *Y02D 70/26* (2018.01)

(56) References Cited

U.S. PATENT DOCUMENTS

| | | | | |
|---|---|---|---|---|
| 2008/0313110 | A1* | 12/2008 | Kreamer | G06Q 10/06 706/12 |
| 2009/0161243 | A1* | 6/2009 | Sharma | G11B 27/36 360/31 |
| 2010/0017240 | A1* | 1/2010 | Tamada | G03G 15/0894 705/308 |
| 2010/0238814 | A1 | 9/2010 | Chen et al. | |
| 2012/0169482 | A1* | 7/2012 | Chen | G08C 17/02 340/12.52 |
| 2013/0244687 | A1* | 9/2013 | Stargardt | G01S 5/0252 455/456.1 |
| 2014/0122878 | A1* | 5/2014 | Cho | H04L 67/02 713/168 |
| 2014/0223361 | A1* | 8/2014 | Huang | G06F 3/0481 715/808 |
| 2015/0281127 | A1* | 10/2015 | Liu | H04L 49/25 370/401 |
| 2016/0242088 | A1* | 8/2016 | Wang | H04W 28/0284 |

FOREIGN PATENT DOCUMENTS

| | | |
|---|---|---|
| JP | 2009-527844 A | 7/2009 |
| JP | 2013-003638 A | 1/2013 |
| JP | 2013-102263 A | 5/2013 |

OTHER PUBLICATIONS

Hamilton, J.D., "Time Series Analysis", Princeton Univeristy Press, Princeton, New Jersey, 8 pages, https://sisis.rz.htw-berlin.de/inh2007/12357004.pdf.

Hong, Y. and Youn, J., "Sleep Node Control Mechanism for Constrained Networks Draft-Hong-1wig-Sleepmode-control-00" Network Working Group, Internet-Draft, Nov. 7, 2013, 9 pages.

International Patent Application No. PCT/US2015/038503: International Preliminary Report on Patentability dated Jan. 12, 2017, 8 pages.

oneM2M "oneM2M Functional Architecture Baseline Draft", TS-0001 V0.4.2, Mar. 4, 2014, 202 pages.

oneM2M "Service_Compenent_Architecture" TS-0007 V0.1.0, Feb. 22, 2014, 17 pages.

Rahman, A. and Dijk, E., "Group Communication for CoAP", IETF, Jul. 2011, http://tools.ietf.org/html/draft-rahman-core-groupcomm-06.

Shelby et al, "Constrained application Prtocol (CoAP) Draft-ietf-Core-Coap-18", CoRE Working Group, Internet-Draft, Jun. 28, 2013, 118 pages.

Shelby et al, "Neighbor Discovery Optimization for Low Power and Lossy Networks (6LoWPAN) draft-ietf-6lowpan-nd-21", 6LoWPAN Working Group, Internet-Draft, Aug. 24, 2012, 61 pages.

Vial, M., "CoRE Mirror Server Draft-Vial-Core-Mirror-Proxy-01", Internet-Draft, Jul. 13, 2012, 19 pages.

Ye et al, "An Energy-Efficient MAC Protocol for Wireless Sensor Networks", Proc. IEEE INFOCOM, Jun. 2002, 10 pages.

English Translation of JP Office Action dated Mar. 13, 2018 for JP Application No. 2016575105.

* cited by examiner

| Interested Node ID | Interested Time Interval | Estimated Availability | Confidence |

The sub-message structure shown in the bottom of Figure 13

| Data collection relationship ID | Interested Node ID | D(n) | Interested Data 1 | ... | Interested Data n |
|---|---|---|---|---|---|

Interested Data 1 ... Interested Data n (braced together as Interested Data)

| Data Input Sources (collecting data from): | Interested Node | Interested Data: |
|---|---|---|
| <delivery> resouce (Table 9.6.11-1 in [1]) | a CSE | source, lifespan, eventCat, deliveryMetaData, target |
| Service Statistics Collection Record (Table 10.2.15. 10-1 in [1]) | an AE or a CSE | collectedEntityID, event, eventStart, eventEnd |
| <node> resouce (Table 9.6.19-1: in [1]) | A Physical Node | memory, storage, power, schedule |
| <schedule> resouce (Table 9.6.19-1: in [1]) | A Physical Node | scheduleElement |
| Session Mgmt. CSF (proposed in [11]) | an AE or a CSE | session state info. and history (endpoints, duration, routing) |

User Control Panel for Model D of DP

Please indicate which basic function $f$ to be used for building estimator:

Please set the initial values of the parameters of the basic function $f$:

Submit

*FIG. 31*

NETWORK NODE AVAILABILITY PREDICTION BASED ON PAST HISTORY DATA

CROSS-REFERENCE TO RELATED APPLICATIONS

This application is the National Stage of International Application No. PCT/US2015/038503, filed Jun. 30, 2015, which claims priority from U.S. Provisional Patent Application No. 62/018,941, filed Jun. 30, 2014, the disclosures of which are incorporated herein by reference in their entirety.

BACKGROUND

FIG. 1 is a diagram that illustrates an exemplary protocol stack 100 supporting a service layer 102. From a protocol stack perspective, service layers 102 are typically layered on top of application protocol layer 104 and provide value added services to client applications. Hence, service layers 102 are often categorized as 'middleware' services.

An M2M/IoT service layer is an example of one type of service layer specifically targeted towards M2M/IoT type devices and applications. FIG. 2 is a diagram that illustrates an exemplary deployment scenario of a M2M/IoT service layer instances within a network. In this example, a service layer instance 202 is a realization of a service layer and a number of service layer instances are deployed on various network nodes (gateways and servers). The service layer instances provide value-added services to network applications, device applications as well as to the network nodes themselves.

Recently, several industry standards bodies (e.g., oneM2M) have been developing M2M/IoT service layers to address the challenges associated with integration of M2M/IoT types of devices and applications into deployments such as the Internet/Web, cellular, enterprise, and home network. A M2M service layer can provide applications and devices access to a collection of M2M centric capabilities supported by the service layer. A few examples of such capabilities include security, charging, data management, device management, discovery, provisioning, and connectivity management. These capabilities are made available to applications via APIs which make use of message formats, resource structures and resource representations defined by the M2M service layer.

The purpose and goal of oneM2M is to develop technical specifications which address the need for a common M2M Service Layer that can be readily embedded within various hardware and software, and relied upon to connect a wide variety of devices in the field with M2M application servers worldwide.

FIG. 3 is a diagram that shows a oneM2M common services layer 302 that supports a set of Common Service Functions (CSFs) (i.e. service capabilities). An instantiation of a set of one or more particular types of CSFs is referred to as a Common Services Entity (CSE) 304 which can be hosted on different types of network nodes, e.g. Infrastructure Node (IN), Middle Node (MN), and Application-Specific Node (ASN) CSE are termed by IN-CSE, MN-CSE and ASN-CSE).

FIG. 4 is a diagram that shows a oneM2M service layer compliant to the Resource-Oriented Architecture (RoA) design principles. Within the oneM2M RoA RESTful architecture (as shown in FIG. 4), CSFs are represented as a set of "resources". A resource is a uniquely addressable element in the architecture having a representation that can be manipulated via RESTful methods such as Create, Retrieve, Update, and Delete. These resources are made addressable using a Universal Resource Identifiers (URIs). A resource may contain child resource(s) and attribute(s). A child resource is a resource that has a containment relationship with a parent resource. The parent resource representation contains references to its child resources(s). The lifetime of a child-resource is limited by the parent's resource lifetime. Each resource supports a set of "attributes" that store information of the resource.

FIG. 5 shows an M2M Service Component Architecture for a legacy deployment that is not RESTful based. This M2M Service Component Architecture is primarily suitable for the infrastructure domain where the CSE 502 is viewed as a set of service components. Within the service layer, it contains various M2M services and multiple services can be grouped into service components. In addition to existing reference points, it introduced the inter-service reference point Msc 504. Communication between M2M Service Components (passing over the Msc reference point 504) utilizes a web service approach, which is the most popular technology for building Service-Oriented Architecture (SoA)-based software systems.

It is known that many M2M/IoT devices have some combination of limited battery power, small memory footprint and low throughput links. Accordingly, many of these devices are "sleepy" and occasionally go into a sleep mode for energy saving. This is a major issue leading to node unavailability considered in most of the previous works.

Wireless sensor network (WSN) is a typical M2M area network that is comprised of a number of low-power devices with sensing and computing capability. In many sensor network systems, the power supply for the network nodes is usually a depletable power source, such as batteries. To increase the lifespan of sensor networks, one power management scheme is to require each network node to wake up periodically to listen to the radio channel. For example, S-MAC is a famous Medium Access Control (MAC) protocol designed for wireless sensor networks. With S-MAC, each node goes to sleep for some time, and then wakes up and listens to see if any other node wants to talk to it. During sleep, the node turns off its radio, and sets a timer to awake it later. The duration of time for listening and sleeping can be selected according to different application scenarios and nodes exchange their schedules by broadcasting to all its immediate neighbors for synchronization. During the awake state, if multiple neighbors want to talk to a node, they need to contend for the medium using Carrier Sense Multiple Access scheme.

Another approach of power management scheme is to use a low-power stand-by hardware component to watch the environment when the node enters sleep mode. For example, a node can use a standby radio-transceiver subsystem to listen to the radio channel when the node sleeps. When the stand-by radio transceiver receives radio signals, it wakes the node up. Otherwise, the node keeps sleeping.

Shortcomings and problems with existing Internet protocols with regards to M2M/IoT use cases (e.g. connecting smart objects to the Internet) have been identified. For example, a major shortcoming of current Internet protocols is that they lack support for sleepy nodes. In other words, it is often assumed that network nodes always remain fully powered, which unfortunately is not the case for many M2M/IoT type devices (that are resource constrained in nature, battery-powered, and sleep a large majority of the time). Accordingly, recently much focus and attention have been given to enhance the architecture and protocols of the Internet to support M2M/IoT networks. For example, prior systems describe a mechanism of sleep mode control, in which the router can control IPv6 sleepy nodes and deliver the packets from/to exterior networks, or described the enhancement of 6LoWPAN Neighbor Discovery (ND) protocol with sleepy node support.

IETF Constrained Application Protocol (CoAP) is a recently developed application protocol specifically for constrained nodes/networks such as wireless sensor networks deployed for smart homes. It has attracted increasing attention and is a promising messaging protocol for IoT systems. In particular, some work has been done to enhance the CoAP protocol for supporting sleepy nodes.

Beyond the CoAP protocol enhancement as mentioned above, other efforts have also been made for supporting sleepy nodes within the IETF Constrained RESTful Environments (CoRE) working group. For example, one of the ideas is to adopt a Resource Directory (RD) mechanism where sleepy nodes can register/update their list of resources (as well as their sleeping-related status) on a central (non-sleepy) RD server. This allows clients to discover the list of resources from the RD for a sleepy node and determine whether a targeted resource is located on a sleepy node, whether a sleepy node is currently in sleep mode, or when a sleepy node will be in awake state again. Another example is related to Mirror Server (MS), which is a web server that allows a sleepy node to create resources in the MS resource tree. In particular, for energy efficiency, a sleep node is a client-only endpoint and hence is not able to serve content by itself. In other words, a MS acts as a mailbox between the sleepy node and the client.

FIG. 6 is a diagram that shows a resource called <schedule> 602 from the oneM2M functional architecture specification. The <schedule> resource 602 represents the scheduling information in the context of its parent resource. When the <schedule> 602 is a child of a <node> resource, it can represent the sleeping schedule information stored in the <scheduleElement> resource 604 so that the service layer can be aware of the node sleeping.

With the foregoing as background information, the present application discloses a new method and system for enabling a node availability estimation service.

SUMMARY

Embodiments include a new service at the service layer that supports node availability estimation. A number of new value-added services can leverage this node availability information which improve the operation intelligence, quality of service, communication overhead as well as energy efficiency for M2M/IoT systems.

In one embodiment, a Node Availability Estimation (NAE) service at service layer has three major components: Real-time Data Collection component (DC), Data Processing for Estimating Node Availability component (DP), and Node Availability Service Provisioning component (SP).

The DC can collect real-time data from input sources at service layer (e.g., other existing CSFs). The DC can use a procedure for data collection relationship and policy establishment and the related new message structure, a procedure for data collecting and reporting and the related new message structure; and a procedure for data collection relationship and policy updating.

The DP can execute data processing for estimating node availability based on the data collected by DC. The functional architecture of the DP can include a number of modules including Information Deduction, Information Fusion, Input Format Parsing, Building Node Availability Estimator, Node Availability Estimating, Estimator Evaluation and Data Collection Strategy Determination and Output Generation and Feedback Collection.

The SP can store the estimated node availability results from DP and expose them to service clients in terms of "node availability estimation services". The SP can be a service provisioning portal.

Multiple DCs, DPs and SPs can interact with each other for collaboration and data sharing including collaboration between two DPs on data collection and collaboration between two DPs and two SPs on service provisioning and estimation results sharing.

A number of new value-added services can be provided including node availability-aware session establishment, intelligent store-and-forward resource prefetching, and proactive node triggering supported by service layer.

Embodiments can include a oneM2M functional architecture embodiment, a oneM2M service component architecture embodiment, embodiments on data collection from input sources in the oneM2M service layer, embodiments on data processing executed at an Information Deduction module and Information Fusion module of the DP, and a oneM2M embodiment of the node availability estimation service provisioning by defining new resources.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein:

FIG. 28 is a diagram that illustrates exemplary data collection, processing and node availability service provisioning embodiments of NAE at a oneM2M Service Layer.

FIG. 31 is a diagram of a Graphical User Interface of one embodiment.

DETAILED DESCRIPTION OF ILLUSTRATIVE EMBODIMENTS

Figure 1:
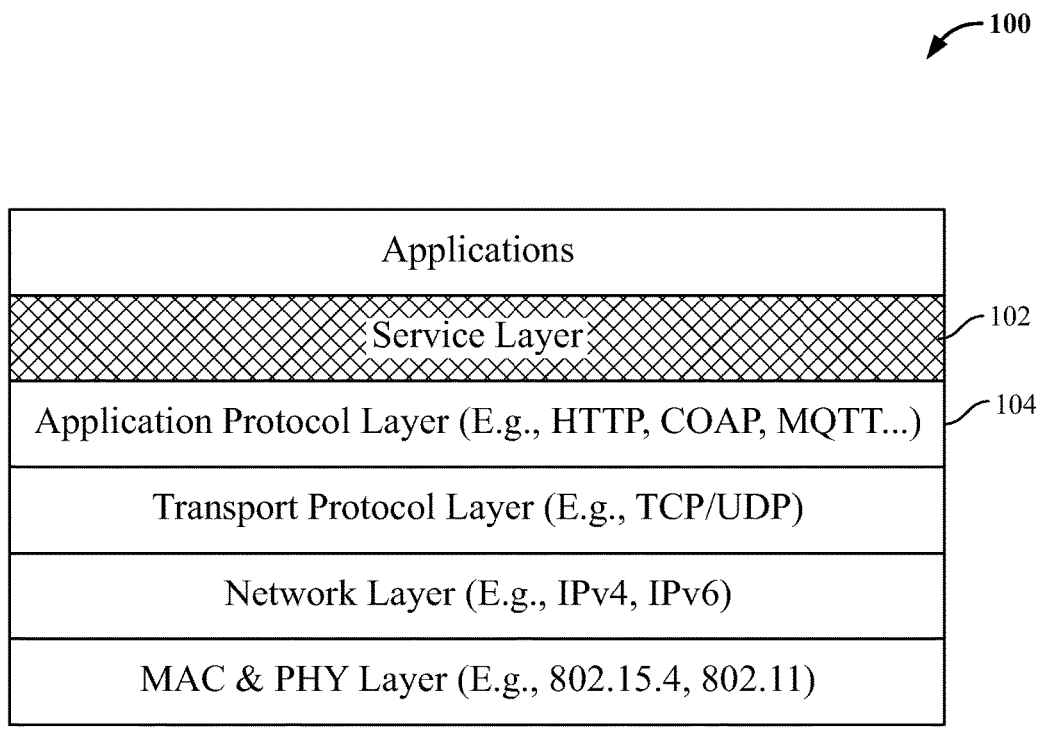
FIG. 1 is a diagram that illustrates an exemplary protocol stack supporting a service layer.
Figure 2:
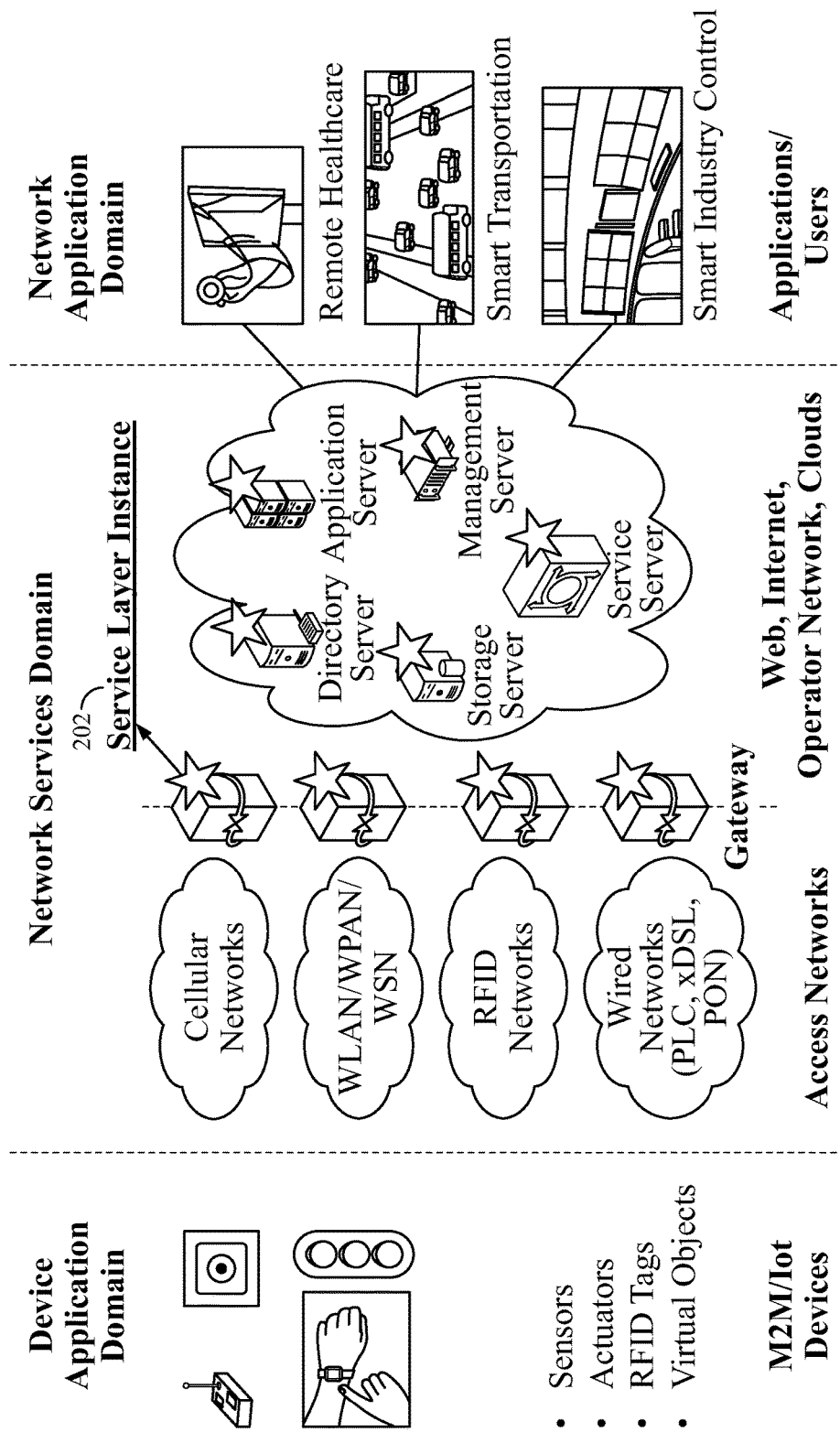
FIG. 2 is a diagram that illustrates an exemplary deployment scenario of a M2M/IoT service layer instances within a network.
Figure 3:
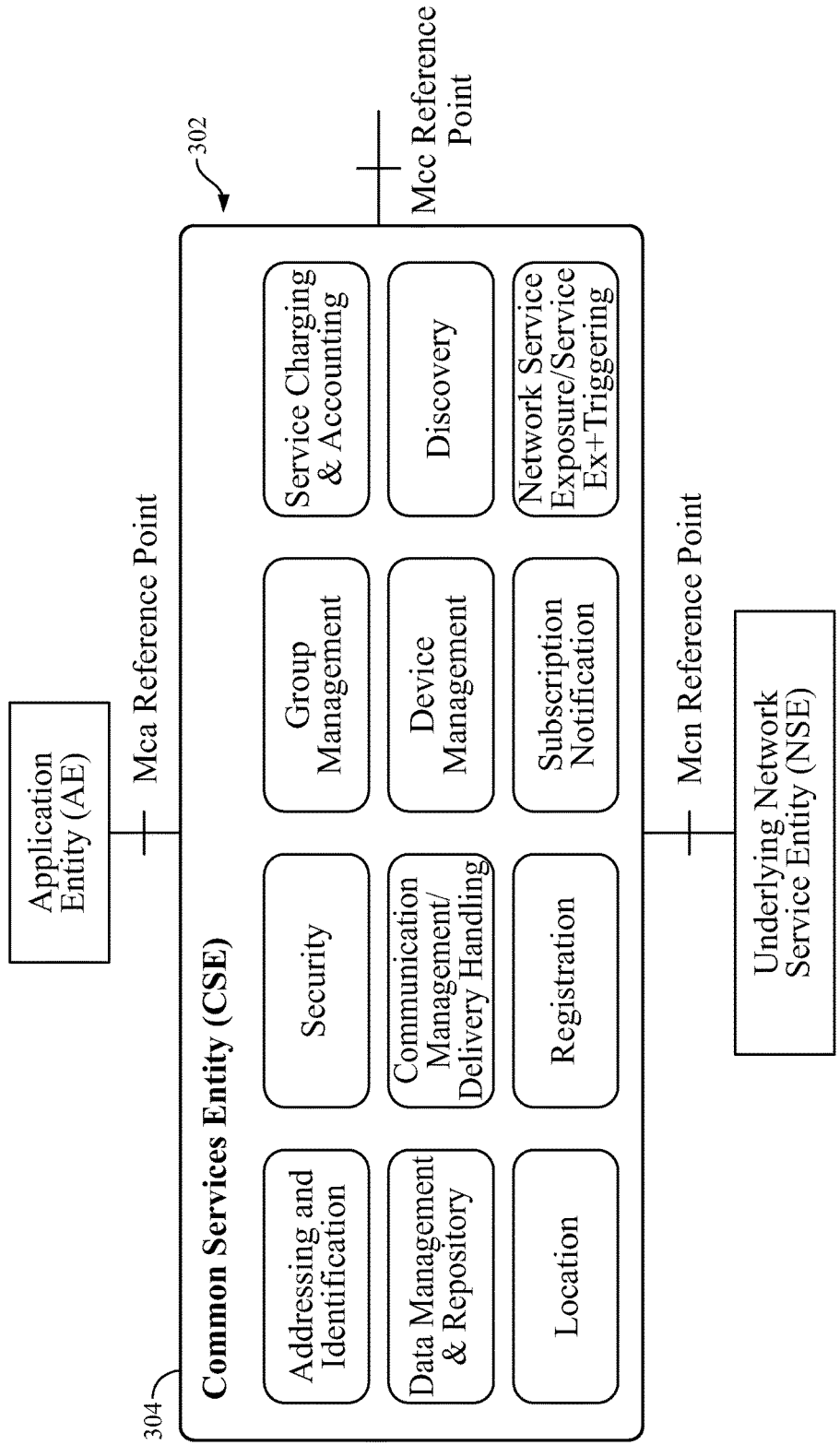
FIG. 3 is a diagram that shows a oneM2M common services layer that supports a set of Common Service Functions (CSFs).
Figure 4:
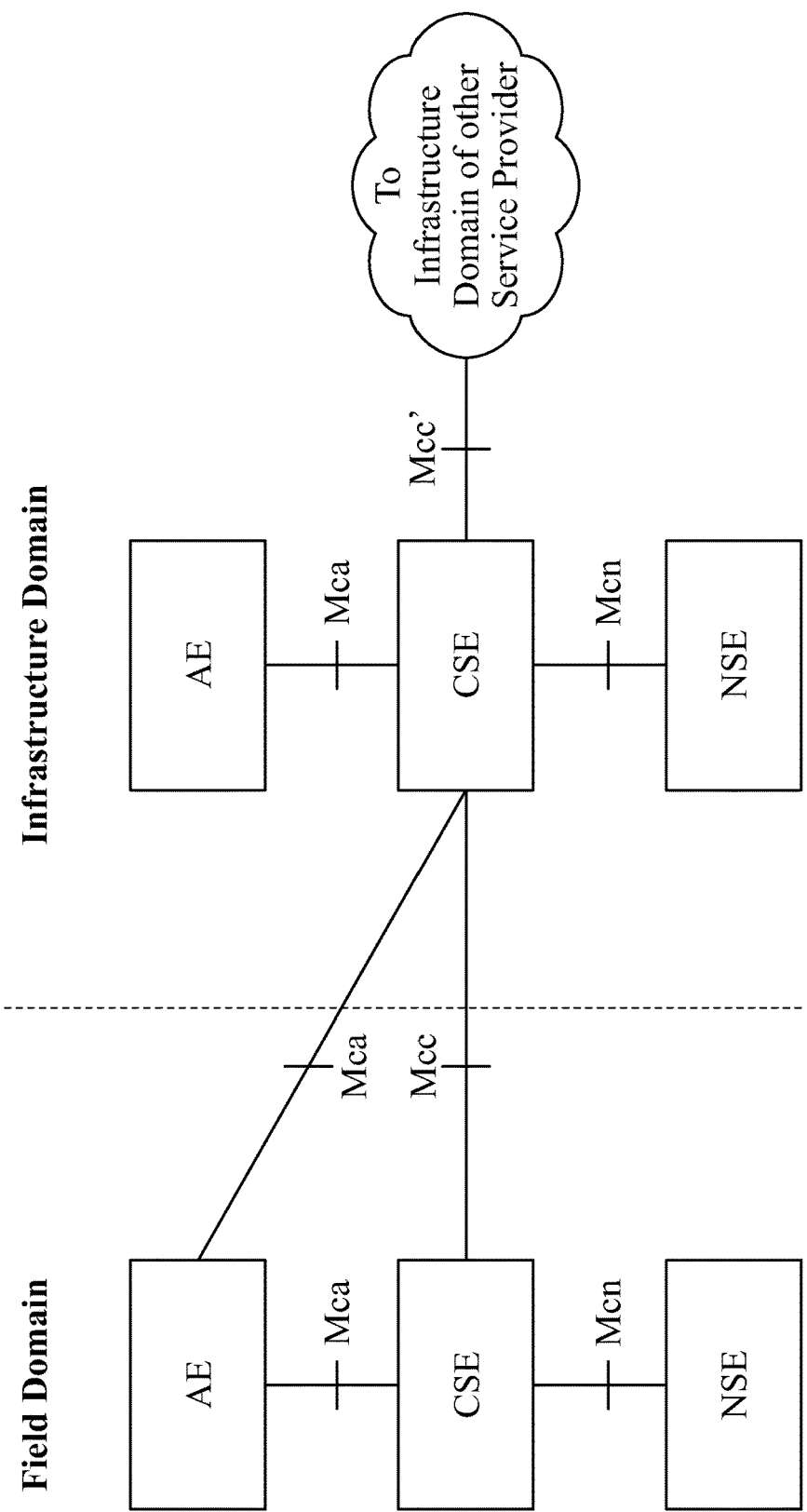
FIG. 4 is a diagram that shows a oneM2M service layer compliant to the Resource-Oriented Architecture (RoA) design principles.
Figure 5:
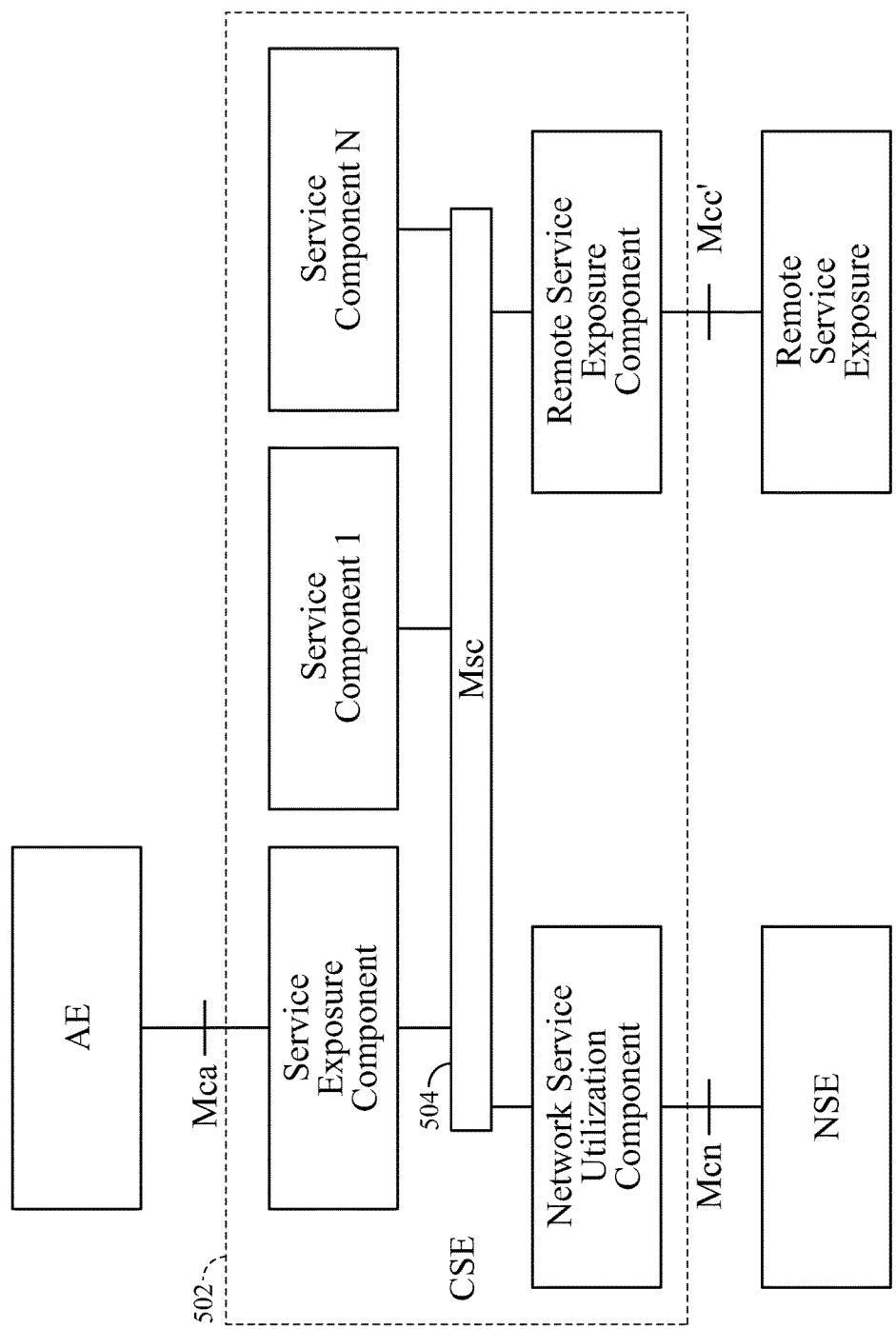
FIG. 5 shows an M2M Service Component Architecture developed to consider legacy deployment that is not RESTful based.
Figure 6:
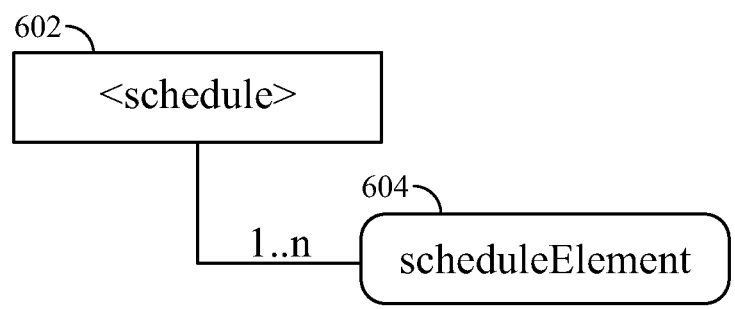
FIG. 6 is a diagram that shows a resource called <schedule> from the oneM2M functional architecture specification.
Figure 7:
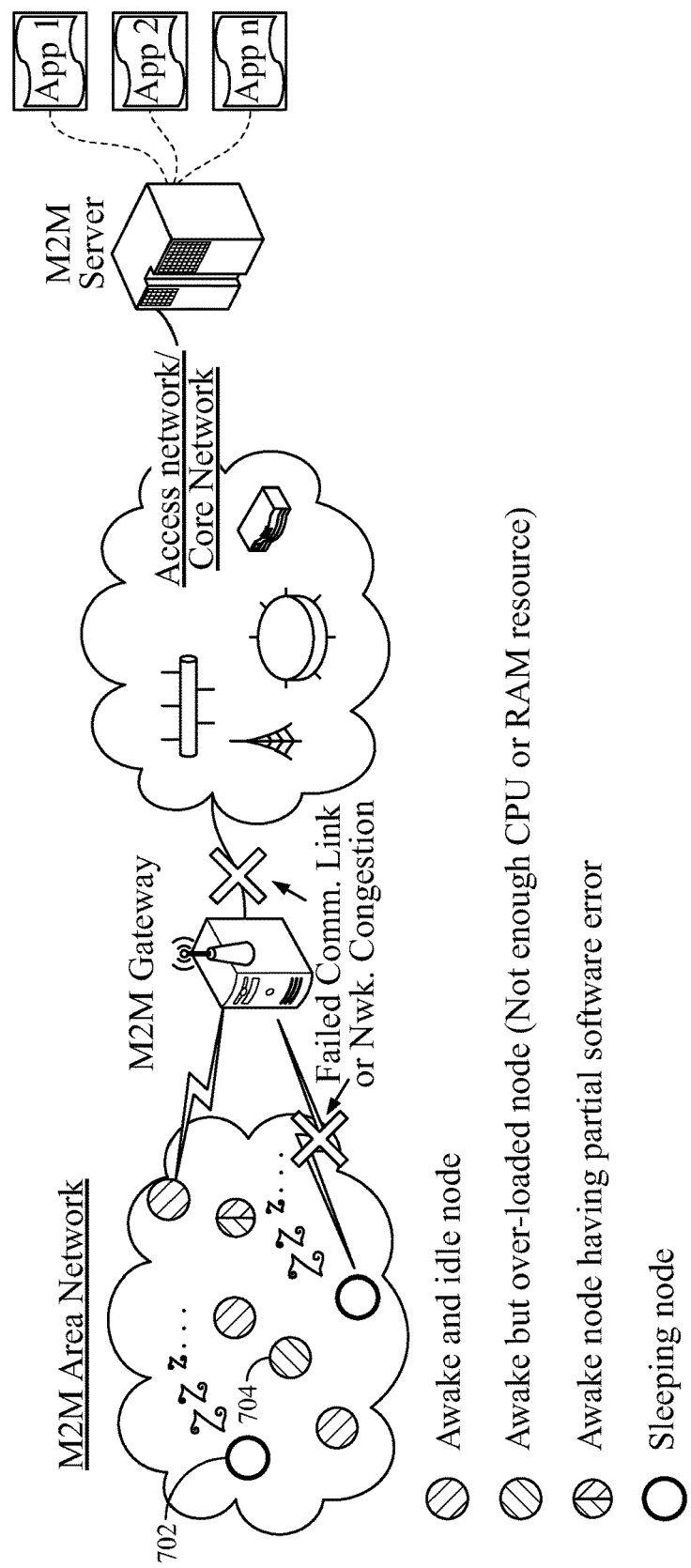
FIG. 7 is a diagram that illustrates an M2M/IoT System with different node unavailability cases.

FIG. 7 is a diagram that illustrates an M2M/IoT System with different node unavailability cases. It is understood that the functionality illustrated in FIG. 7, may be implemented in the form of software (i.e., computer-executable instructions) stored in a memory of, and executing on a processor of, a node of an M2M network (e.g., a server, gateway, device, or other computer system), such as one of those illustrated in FIG. 32C or 32D described below.

Most prior systems focus on the physical node sleeping issue, which is mainly caused by the energy efficiency design principle for the resource constrained devices. Instead of being limited to sleepy nodes, embodiments concern "node availability" in the sense that the node concept could be extended by referring to not only a physical node, but also a logical node e.g. a service layer instance or an application instance (e.g., a CSE or an AE in oneM2M domain, respectively), which in fact can be software modules running on the physical devices.

For a given (physical/logical) node, the following causes may lead to its unavailability.

The device 702 goes into sleep state such that the physical node itself is unavailable (at PHY layer). This is the classical case that has been discussed in the previous sections.

The underlying network has routine operations (e.g., a normal connection torn-down operation in cellular networks for releasing resources) or network issues (e.g. a network traffic congestion) such that the node is isolated and cannot be interacted with others peers (i.e., unavailable at network layer).

The device 704 runs out of its computing resources (e.g., CPU, RAM, etc.) such that the upper-layer running software cannot response to any information received from the radio interface. Similarly, a specific software module on a device could be crashed (e.g., a software error) or could be disabled by the operation system. For the above two cases (i.e., unavailable at service and application layer), if the software is related to a service layer instance (e.g., a CSE), this CSE will be unavailable. In comparison, if the software is related to an application instance (e.g., an AE), only this AE will become unavailable.

From a service layer perspective, the node concept being considered in this specification could be either a physical device, or a logical node (e.g., a CSE or an AE in the oneM2M context). Accordingly, a "node is available" means that the node is able to interact and communicate with other peers. Due to the extended concept of "node", a number of new factors may lead to node unavailability besides the classical reason such as physical node (e.g., sensors) sleeping for energy efficiency purpose.

Node availability information is very valuable for efficient end-to-end communications at service layer in M2M/IoT systems. For example, if a CSE (say CSE-1) learns that CSE-2 is not available for a long time, it could intelligently choose not to initiate a communication connection request to CSE-2, instead of trying to contact CSE-2 but ending up with a failed connection establishment operation. In particular, the node availability knowledge is often not immediately clear or known in advance (for example, a physical node may not have a fixed sleeping schedule or a logical node may become unavailable from time to time due to runtime issues e.g., software overloading or error). Accordingly, a fundamental question when such node availability information is missing at service layer is how to estimate the node availability? The existing service layer lacks such a capability to estimate node availability and there is no previous work addressing how to enhance the service layer to provide such a unique feature.

Cross Protocol Stack Node Availability. Although node availability can be supported across the protocol stack (but in a reactive manner as mentioned next), how to proactively deal with node availability in terms of estimating node availability is not in the scope of any existing works from low layers. For example, MAC layer can enable sleepy node support for energy saving but it is not aware of or cannot understand a CSE unavailability event at service layer due to e.g., a software error for a CSE instance. In particular, MAC layer often reactively deals with the unavailability issue at upper layer in the sense that it has timers and can release the radio resources (PHY & MAC) if it does not get the responses from the higher layer after a waiting period indicated by the timers. Similarly, although existing works at network layer focused on IPv6 neighbor discovery with sleep node support, a CSE unavailability event at high-layer is not in their scope either. With MAC layer, IP layer can only reactively dealing with the unavailability issue at upper layer by using timers to release the resources under after a time out. In the meantime, it is true that service layer may query the low layers for the availability of a sleepy node if the sleeping is not configured at the service layer. However, if the devices are operated in an event-driven manner without a pre-defined/clear sleeping schedule (which is the case in most of M2M/IoT scenarios), the low layers could only provide the node availability for the current time (i.e., what is happening now) and is incapable of providing an estimated availability pattern or schedule. Overall, it will be desirable if the service layer (which is nearer to those connection initiators) has the capability of estimating node availability, with which it could proactively terminate or does not even start the connection establishment process for those requests having low success probability due to the possible node unavailability. In this way, the service layer does not have to rely on the low layers to reactively figure out a connection cannot be established.

Service Layer Node Availability Horizontally examining the service layer itself, it currently does not support node availability estimation. It would be beneficial if node availability estimation was done at service layer by examining the vertical network stack, but unfortunately, the existing service layer does not support such a service. It is true that the <schedule> resource has been defined in the oneM2M service layer to represent node sleep schedule, however, how this information is obtained has not been fully investigated. So far, it is often assumed that node sleep schedule is reported by the nodes and is known in advance (i.e. already ready for use), which obviously is not the case especially when a CSE becomes unavailable due to a runtime software error. More than that, a more challenging and common case as mentioned earlier is that nodes may not have clear or pre-defined schedules at all. In such a case, the node availability estimation should be enabled at service layer. In addition, there are many existing entities at service layer (interacting with underlying networks and low layers) that provide much real-time data (which may not directly reflect node availability but are very valuable as data sources for estimating node availability) which makes the service layer in a unique position as a good candidate for node availability estimation.

Existing Service Layer Cannot Facilitate Value-added Services that Could Be Affected by Node Availability. Many existing operations at service layer may not be intelligent enough when dealing with the node availability issue. This section only briefly presents one representative example as shown in FIG. 8.

Figure 8A:
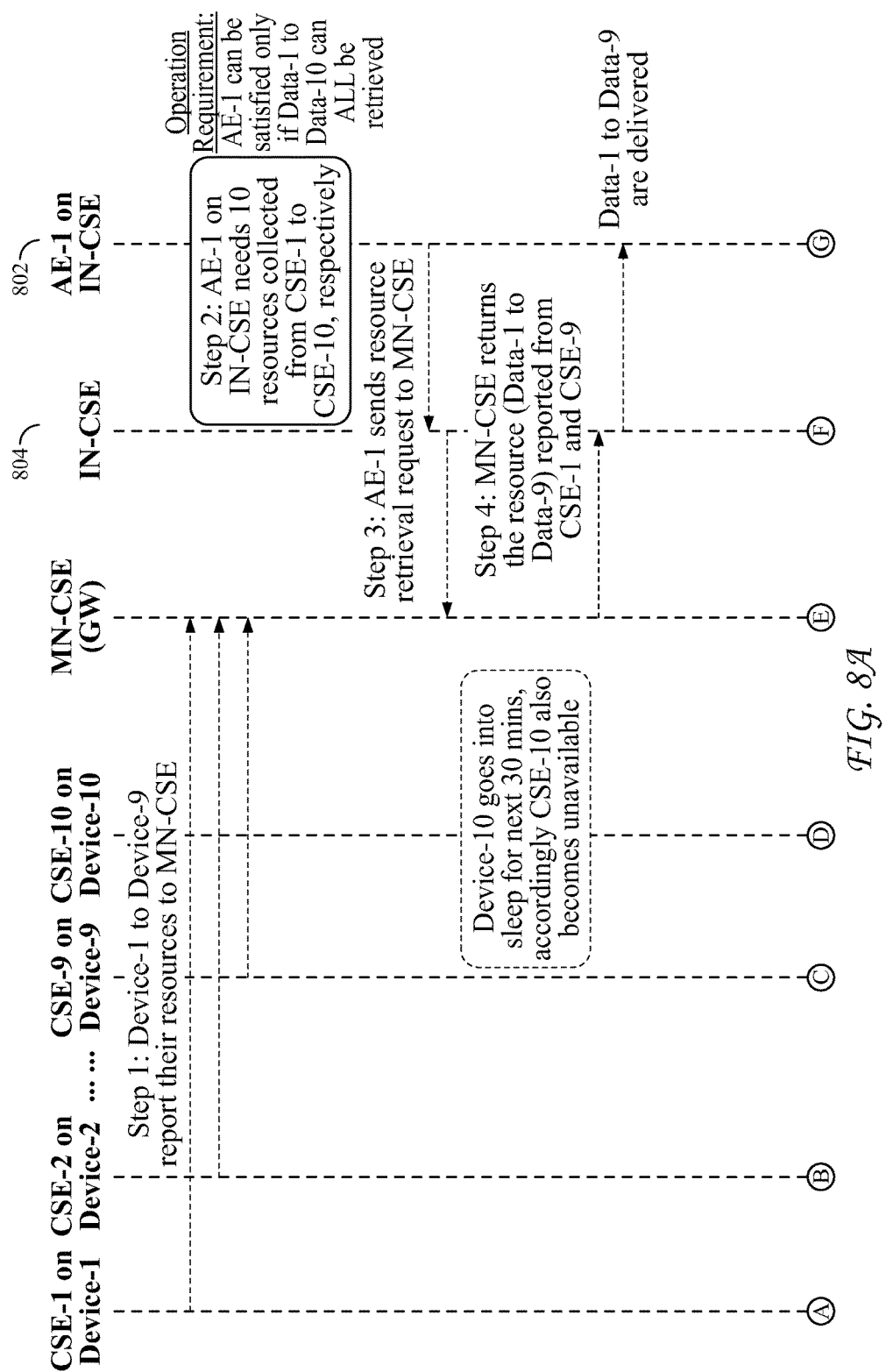
FIG. 8 is a diagram that illustrates a use case with inefficient resource retrieval operations without node availability information.
Figure 8B:
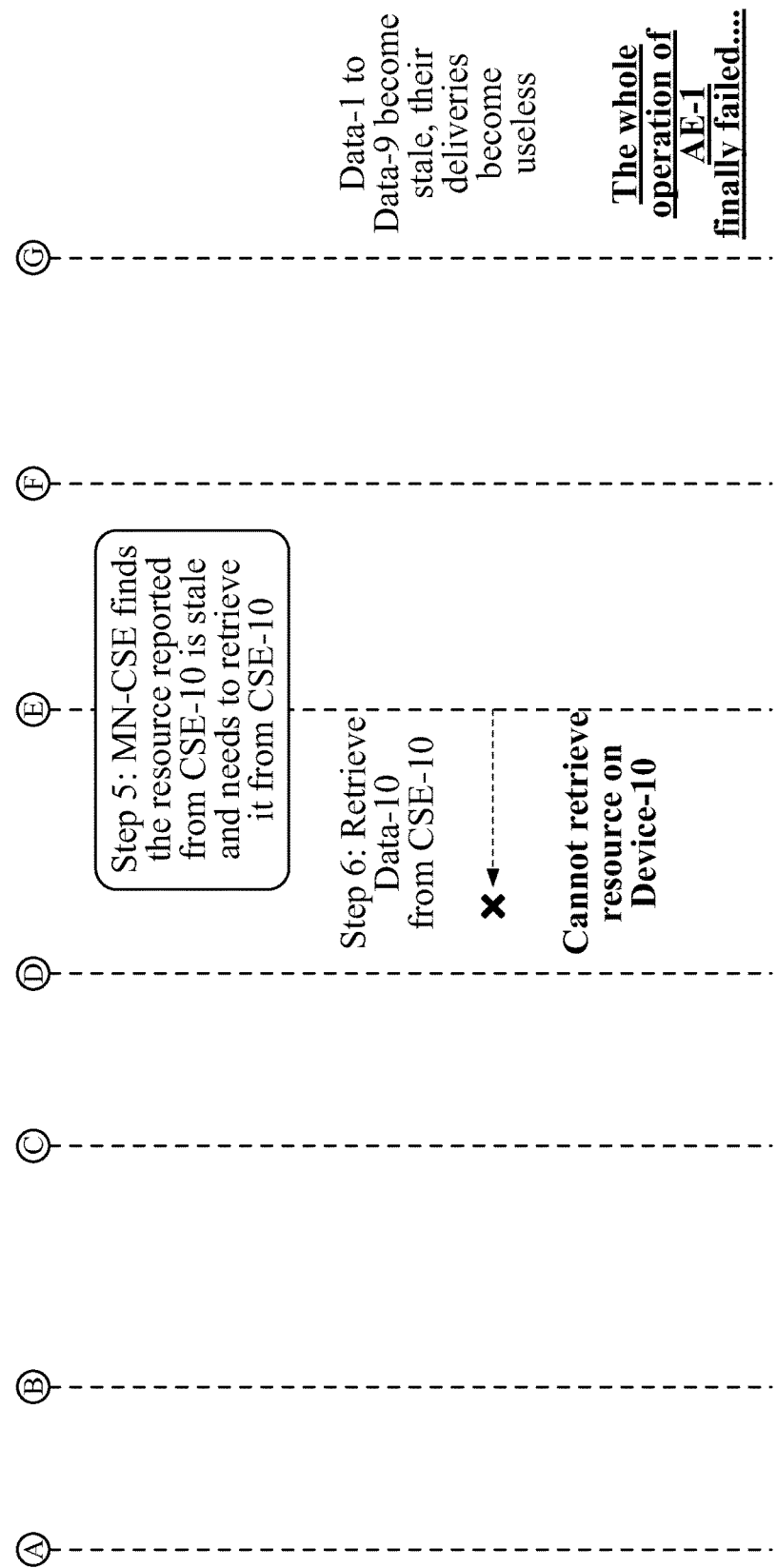

FIG. 8 is a diagram that illustrates a use case with inefficient resource retrieval operations without node availability information. It is understood that the entities performing the steps illustrated in FIG. 8 are logical entities that may be implemented in the form of software (i.e., computer-executable instructions) stored in a memory of, and executing on a processor of, a network node or computer system such as those illustrated in FIG. 32C or FIG. 32D. That is, the method(s) illustrated in FIG. 8 may be implemented in the form of software (i.e., computer-executable instructions) stored in a memory of a network node, such as the node or computer system illustrated in FIG. 32C or FIG. 32D, which computer executable instructions, when executed by a processor of the node, perform the steps illustrated in FIG. 8. It is also understood that any transmitting and receiving steps illustrated in FIG. 8 may be performed by communication circuitry of the node under control of the processor of the node and the computer-executable instructions (e.g., software) that it executes.

AE-1 802 on a CSE in the infrastructure domain (i.e., a IN-CSE 804) is required to retrieve resources (e.g., Data-1 to Data-10) from ten CSEs (e.g., CSE-1 to CSE-10) on ten different devices (e.g., Device-1 to Device-10) in an area network, according to its application operation requirement. Assuming CSE-1 to CSE-9 have just reported their resources to MN-CSE 806, then AE-1 802 could easily obtain those resources (i.e., Data-1 to Data-9) directly from MN-CSE 806. However, if Data-10 currently stored on the MN-CSE 806 is already stale, MN-CSE 806 may have to retrieve Data-10 again from CSE-10. But, if Device-10 already went to sleep for a long time and its sleeping schedule is not pre-defined and reported to the service layer (e.g., stored in the <schedule> resource in MN-CSE), such a resource retrieval operation may not be successful if the low-layer mechanisms cannot help in this case. For example, although proxy or mirror server is implemented at application protocol layer by IETF CoRE working group for supporting sleep nodes, AE-1 may still need to contact Device-10 if the resource stored in the mirror server or proxy is getting stale as well. Therefore, the unsuccessful operation on Device-10 would void all the previous efforts (i.e., the successful retrievals of Data-1 to Data-9 from CSE-1 to CSE-9), leading to a failure for the whole operation for AE-1. More than that, the network resources consumed by the previous operations are all wasted without bringing any benefit. In fact, if the service layer could somehow estimate the node availability, the above operations can be essentially improved and an operation requirement aware resource retrieval operation (as a value-added service) can be enabled. Overall, no existing works have specifically investigated what value-added services can be enabled by service layer when dealing with node availability issue.

As a theoretical background for some of the calculations below, on given a targeted variable y (which is the function of time t), its current and future values can be estimated based on the historical values in the past time units.

Formally, for a given interested node i, a Boolean variable $y_i(t)$ is defined to indicate the availability of node i at time unit t (Assume the current time unit is $t_c$). For example, $y_i(t)=1$ denotes node i is available at time unit t while $y_i(t)=0$ means node i is unavailable otherwise. In order to estimate the availability of node i, it is needed to build an estimator. In fact, an estimator of $y_i(t)$ can be formulated as a function of time unit t (denoted by $f_i(t)$), which is given by:

$$y_i(t)=f_i(t,a_n,a_{n-1},a_2,a_1,a_0) \qquad (1)$$

It can be seen that $f_i(t)$ could be a function of t, which could be polynomial, linear or non-linear, etc, and includes a number of parameters i.e., $a_n, a_{n-1}, \ldots a_1, a_0$. Initially, those parameters do not have any concrete values. In particular, "an estimator building process" is to use the historical data of $y_i(t)$ in the previous time units (e.g., $y_i(t_c-1)$, $y_i(t_c-2), \ldots y_i(t_c-k)$) to determine the values for those parameters, based on different technologies, such as curve fitting, time series analysis, etc. Once a concrete $f_i(t)$ has been shaped (i.e., all the parameters $a_n, a_{n-1}, \ldots a_1, a_0$, have the concrete numerical values), it can be used as an estimator to estimate the availability of node i for $t_c$ and a future time unit after $t_c$. This is because given a time unit $t' \geq t_c$, the estimator $f_i$ will output an according y(t'), which can be regarded as the estimated node availability at time unit t'.

Just as an simple example, it is assumed that node i has the following historical availability schedule that during the past 20 time units, it slept for 4 time units and then waken up for another 6 time units before going to sleep again. Based on those information, an estimator can be built and have the following concrete expression (i.e., the whole equation does not have any undetermined parameters. Note: MOD denotes the modulo operation):

$$y_i(t) = \frac{1 + (-1)^{max\{1, min[2,(tMOD10)-4]\}}}{2} \quad (2)$$

Accordingly, by inputting any current or future time unit t into Eq. (2), it will output a 0 or 1 value, which is the estimated node availability of node i at that time unit.

Figure 9A:
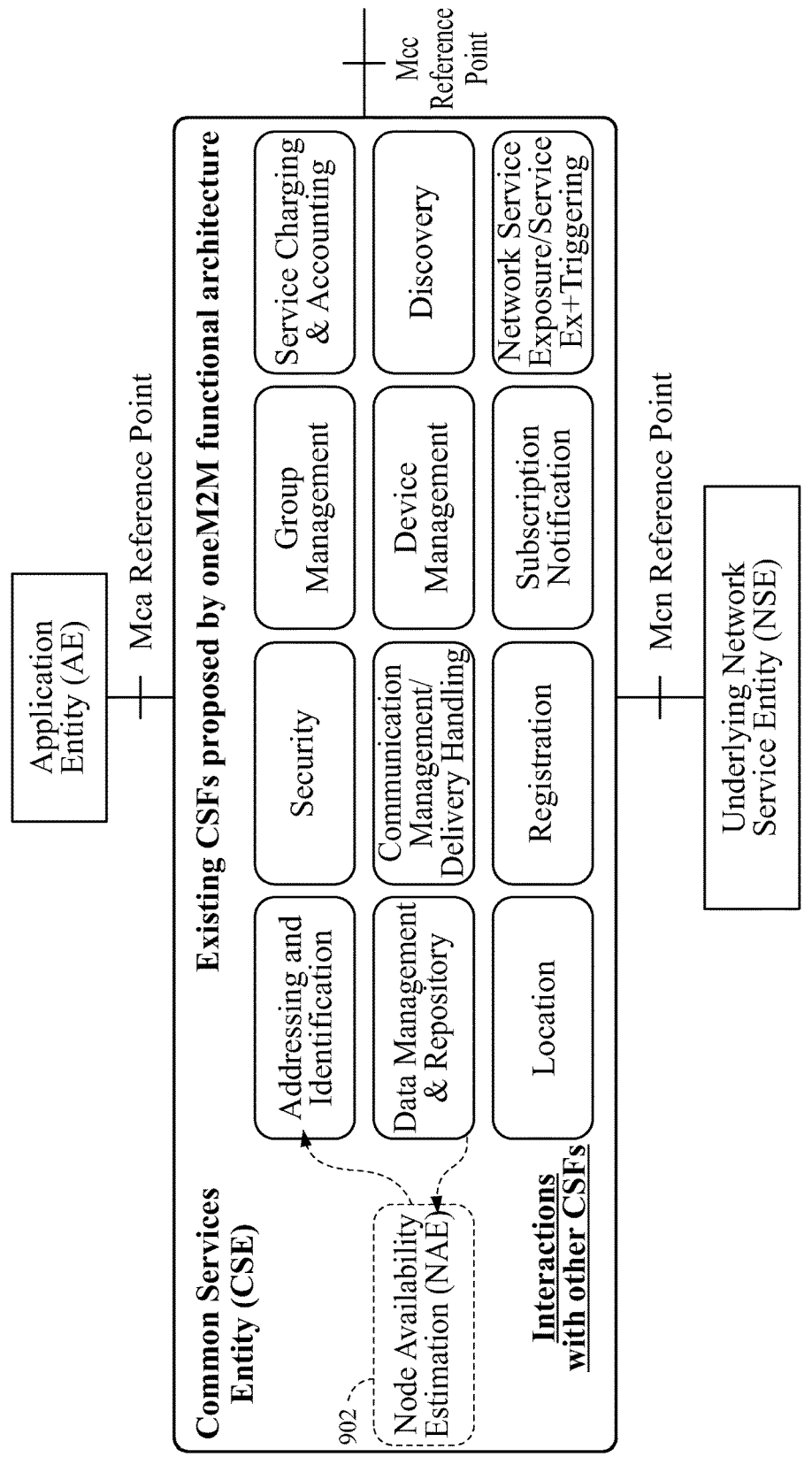
FIG. 9A is a diagram that shows one embodiment of how a NAE fits into a service layer.

A Node Availability Estimation (NAE) service can be implemented in a loosely-coupled way in the sense that each of its components has individual functionality. FIG. 9A is a diagram that shows one embodiment of how a NAE fits into a service layer. FIG. 9A and many of the following Figures will use a oneM2M service layer as an example. Although the specification focuses on the oneM2M example, the described embodiments are not limited to oneM2M and can be generalized to any service layers.

In the example of FIG. 9A, the NAE 902 can be regarded as a CSF. The NAE 902 can accomplish the node availability estimation by interacting with the existing CSFs (e.g., session management CSF, Communication Management Delivery Handling CMDH CSF, etc.). Depending on how NAE 902 is deployed (e.g., in a centralized way or a distributed way), the different reference points (e.g., mac, mcc, mcc' or mcn) will be affected.

Figure 9B:
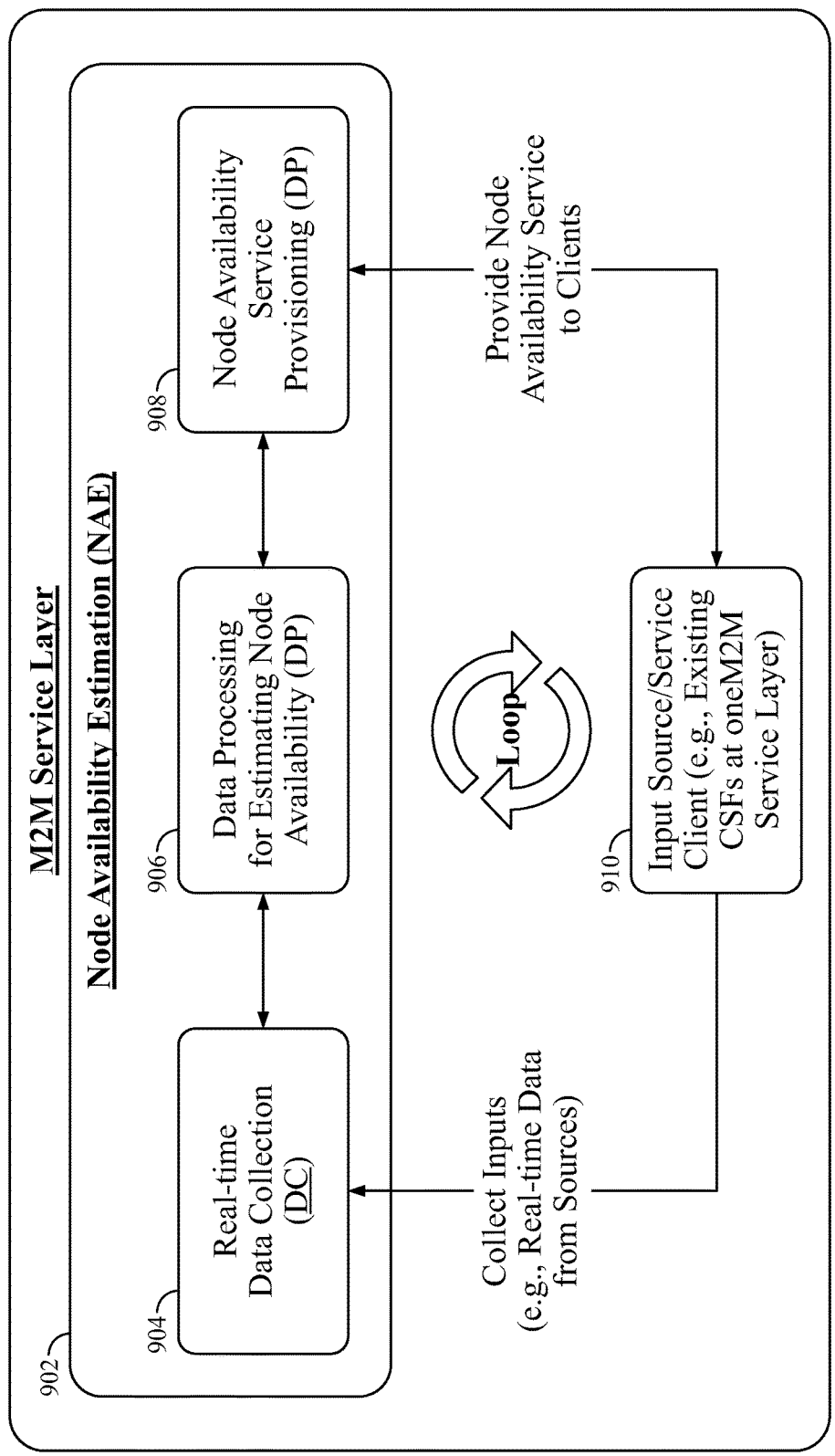
FIG. 9B is a diagram illustrating the functional architecture of a NAE.

FIG. 9B is a diagram illustrating the functional architecture of a NAE 902. In the example of FIG. 9B, the NAE 902 has three components.

Data Collection (DC) 904. In order to derive or estimate node availability, NAE 902 can collect real-time data from input sources (which for example could be e.g., existing CSFs at oneM2M service layer) using the DC 904. The interactions between DC 904 and DP 906 can be as follows: on one hand, DC 904 inputs the collected data to the Data Processing (DP) 906 component, where the collected data will be processed for estimating availability of different nodes; on the other hand, DP 906 also dynamically informs the DC 904 about the data collection strategy by evaluating the accuracy or confidence of the node availability estimation results. In other words, DC 904 can collect data from input sources by following the data collection strategy provided by DP 906.

Data Processing (DP) 906. DP 906 can execute a number of processing steps (such as data interpretation, information deduction, information fusion, building node availability estimator, etc.), and can yield the estimated results for node availability based on the data collected from DC 904. In addition, DP 906 can evaluate the accuracy of the estimated results, and then can dynamically adjust the data collection strategy, which is the operation guideline for DC 904.

Service Provisioning (SP) 908. DP 906 can output the node availability estimation results to the SP 908, which is the portal where the clients could interact with NAE 902 for querying the node availability information. In particular, DP 906 provides those estimated node availability information to service clients as "node availability estimation services".

In the example of FIG. 9B, there exists an interaction loop between the input sources or service clients. In particular, on one hand, when interacting with DC 904, the input sources 910 (e.g., the existing CSFs in the oneM2M service layer, which do not belong to the NAE) provide various real-time data to the DC 904, such as data related to performance, configuration, event log, error report, statistics, etc. On the other hand, when accessing the node availability estimation services provided by SP 908, those CSFs are also the service clients 910 of NAE 902.

It is understood that the functionality illustrated in FIGS. 9A-B, may be implemented in the form of software (i.e., computer-executable instructions) stored in a memory of, and executing on a processor of, a node of an M2M network (e.g., a server, gateway, device, or other computer system), such as one of those illustrated in FIG. 32C or 32D described below.

Figure 10:
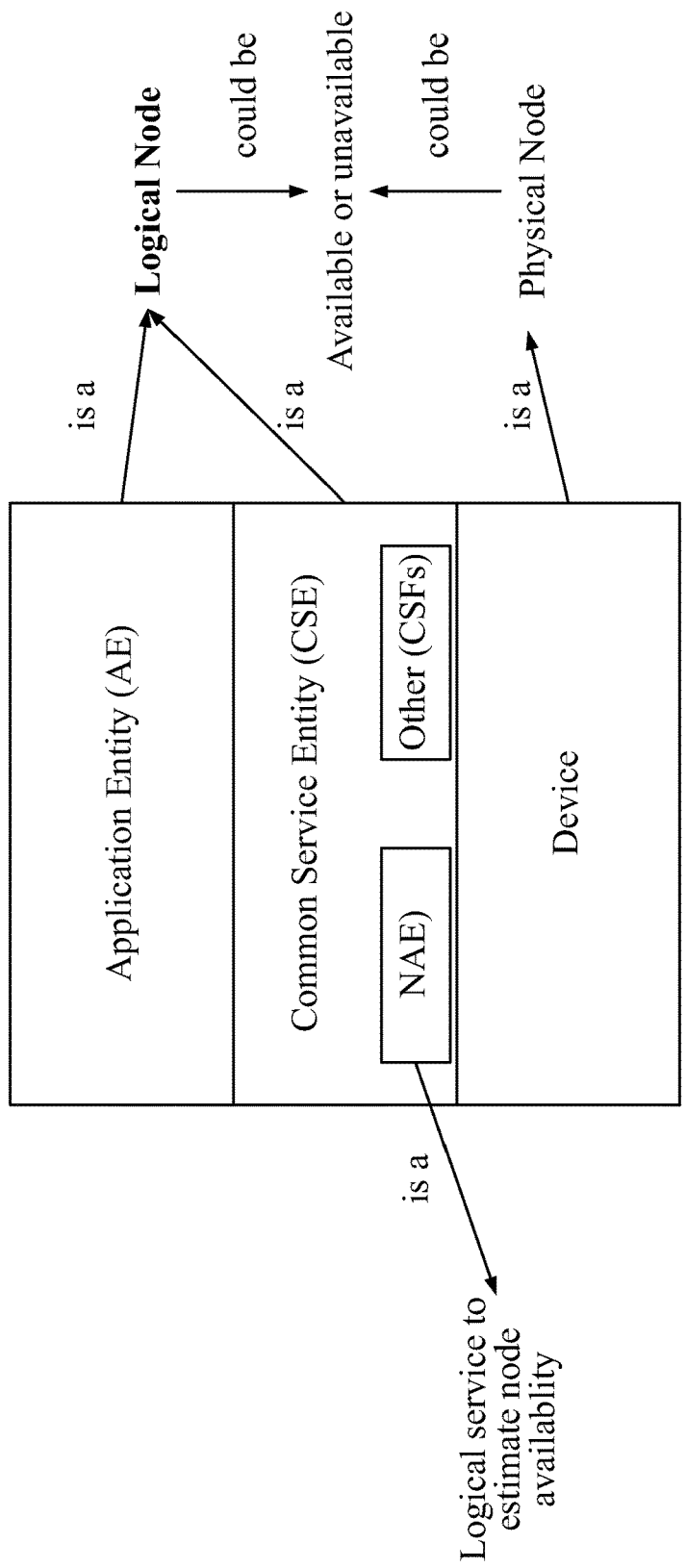
FIG. 10 is a diagram that illustrates terminology related to the NAE and logical and physical nodes.

FIG. 10 is a diagram that illustrates terminology related to the NAE and logical and physical nodes. As discussed below, the targeted node can be a logical node such as a CSE in oneM2M service layer, while a CSE is an instance that implements a set of one or more particular types of CSFs. The NAE can interact with another CSF (say CSF-1) and this may involve the communications between two CSEs (which implement NAE and CSF-1, respectively). When discussing "estimated availability of a node", this generally refers to a physical node or a logical node (like an AE or a CSE). However, when discussing the design details of NAE related to e.g., how real-time data can be collected and how the estimated results are provisioned, the discussion can have the context of a CSF for ease of presentation.

The DC 904 can collect data from input sources by following the data collection strategy made by DP. Typically, one item in a data collection strategy could include the following information (but not limited to):

Source, e.g., which input source (e.g., a session management CSF in oneM2M service layer) that DC 904 intends to collect data from.

Interested Node, e.g., which node is interested by NAE 902 to estimate its availability.

Interested Data, e.g., what type of data of the interested node that DC 904 intends to collect from the source, e.g., the session log data of CSE-1 (i.e. the interested node), which could be collected from the aforementioned session management CSF (as a source).

Message Format, i.e., the format to be used for data exchange.

Policy in terms of desirable data reporting frequency, duration, priority, and the minimum accepted QoS requirement if the desirable values in the initial policy cannot be satisfied.

For each item in the data collection strategy, DC 904 can interact with the corresponding input sources. In particular, three procedures can be involved during a data collection process, which will be discussed below.

It is understood that the functionality illustrated in FIG. 10, may be implemented in the form of software (i.e., computer-executable instructions) stored in a memory of, and executing on a processor of, a node of an M2M network (e.g., a server, gateway, device, or other computer system), such as one of those illustrated in FIG. 32C or 32D described below.

Figure 11:
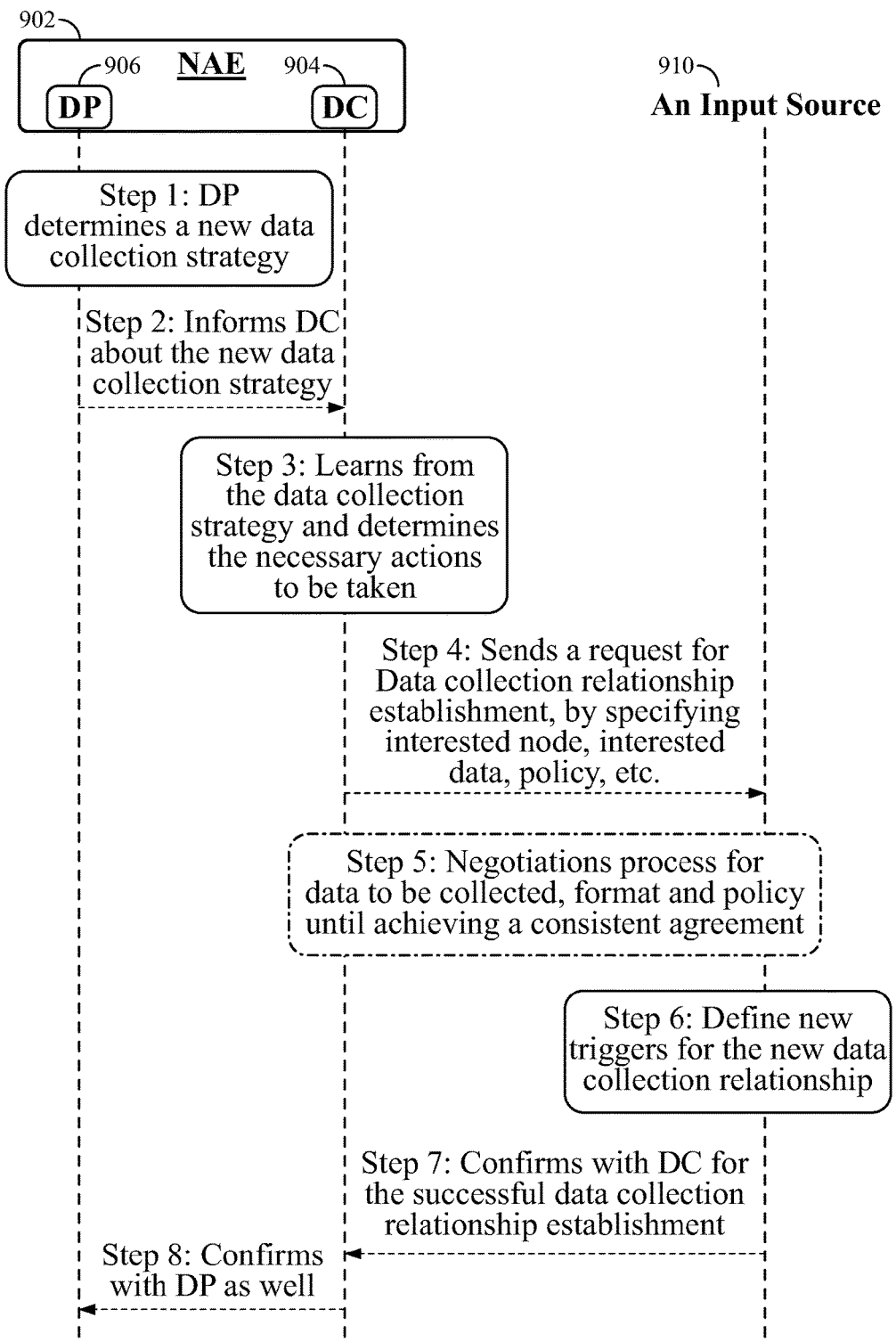
FIG. 11 is a flow chart that illustrates an exemplary procedure for data collection relationship and policy establishment.

When DC 904 needs to collect data from an input source according to an item in a data collection strategy as mentioned earlier, a data collection relationship with a source can be initiated. FIG. 11 is a flow chart that illustrates an exemplary procedure for data collection relationship and policy establishment.

In Step 1 of FIG. 11, the DP 906 determines a new data collection strategy. It can be imagined that a data strategy is like a database table, and each item includes a data collection demand defined by a number of attributes, such as the source, interested node, interested data, data exchange format and data collection policy, etc. The practical data exchange format depends on various implementation choices.

In step 2 of FIG. 11, the DP 906 informs DC 904 about the data collection strategy, which is the trigger or guideline for DC 904 to execute any data collection operations. In other words, DC 904 does not make its own decisions on data collection but just follow data strategy from DP 906 (such a functionality partition design principle is beneficial for building loose-coupled systems).

In step 3 of FIG. 11, after receiving a data collection strategy, DC 904 checks it item by item and determines the necessary operations to be taken. When handling each specific item in the data collection strategy, there could be two cases: Case 1) DC 904 needs to initiate a new data collection relationship (as discussed in this section) for satisfying the demand indicated in this item; Case 2) DC 904 only needs to update an existing data collection relationship for satisfying the demand indicated by the item.

Figure 12:
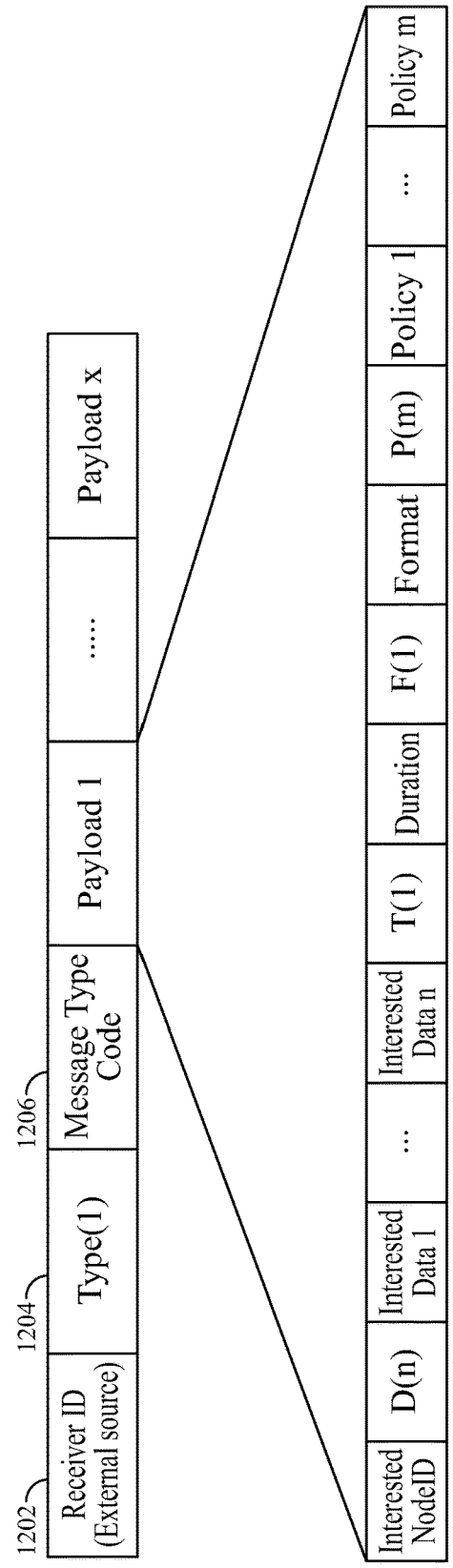
FIG. 12 is a diagram that illustrates an exemplary generic message structure for the request sent from the DC.

In step 4 of FIG. 11, the DC 904 sends a request to the source for establishing new data collection relationships. FIG. 12 is a diagram that shows an exemplary generic message structure for the request used in this step, which mainly carries the attributes of each item of the data collection strategy. In particular, the ReceiverID 1202 can indicate the message receiver. Taking oneM2M service layer as an example, it could be a CSE-ID of a CSE instance, which supports a specific CSF (i.e., as a source). The Type domain 1204 can indicate that this request message is from NAE 902 for data collection relationship and policy establishment. The Payload part 1206 carries a list of sub-messages (each of them corresponds to an item belonging to Case 1 and all those corresponding items have the same source (as indicated by the ReceiverID). Each of sub message (shown in the bottom of FIG. 12 includes the following information: 1) NodeID indicates which the interested node is; 2) what data needs to be collected regarding to this node (The 'D' domain indicates the following fields are used to describe which n number of interested data are to be collected); 3) The 'T' domain indicates the following one field is to describe the duration of the data collection process; and 4) The policy about this data collection relationship is described by m fields after 'P' domain.

In step 5 of FIG. 11, for a given data collection relationship, It is possible that the QoS requirements as indicated in the policy cannot be satisfied/met by the source. Accordingly, there could be several rounds negotiations process between DC 904 and the source for each data collection relationship. In other words, the DC 904 will first include the desirable QoS requirements and policy in the initial request message, but the DC 904 could compromise if it cannot be satisfied until both DC 904 and source achieve a consistent agreement on the QoS requirement and policy. However, if the minimum accepted QoS cannot even be satisfied, the DC 904 can give up establishing such a data collection relationship.

In step 6 of FIG. 11, upon achieving a consistent QoS requirement agreement, the source can define new triggers for supporting the new established data collection relationship, in order to appropriately report related real-time data to DC 904.

In step 7 of FIG. 11, once the new triggers have been set up by the source, it can send back a confirmation to the DC 904 to indicate that the data collection relationship has been successfully established, associated with a "dataCollection-RelationshipID" for future reference.

In step 8 of FIG. 11, since the initial data collection strategy is determined by DP 906 and the QoS requirement could be modified when negotiating with the source by DC 904, DC 904 can also sends back a confirmation to DP 906 for its awareness.

Figure 32A:
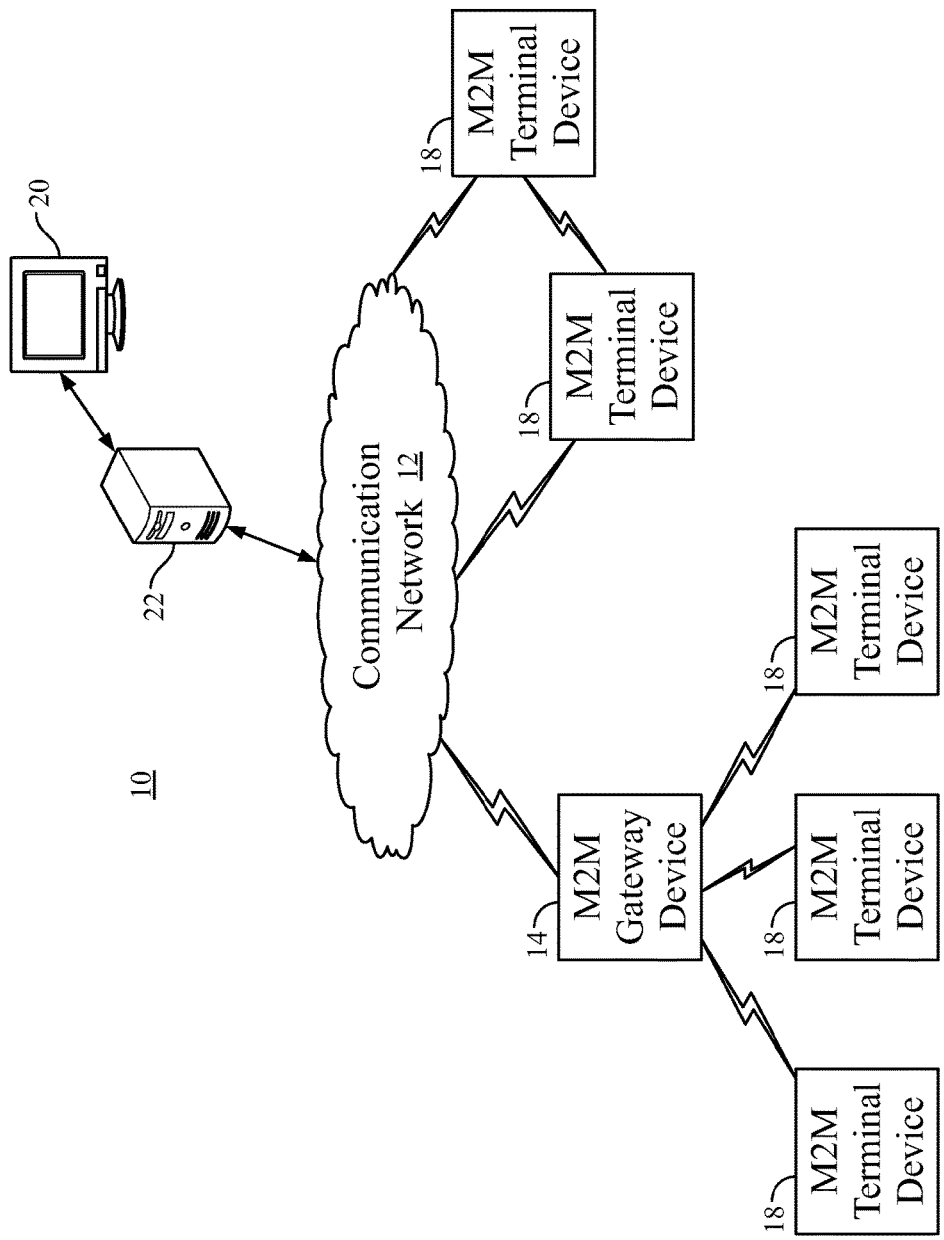
FIG. 32A is a diagram that illustrates an exemplary machine-to machine (M2M), Internet of Things (IoT), or Web of Things (WoT) communication system in which one or more disclosed embodiments may be implemented.
Figure 32B:
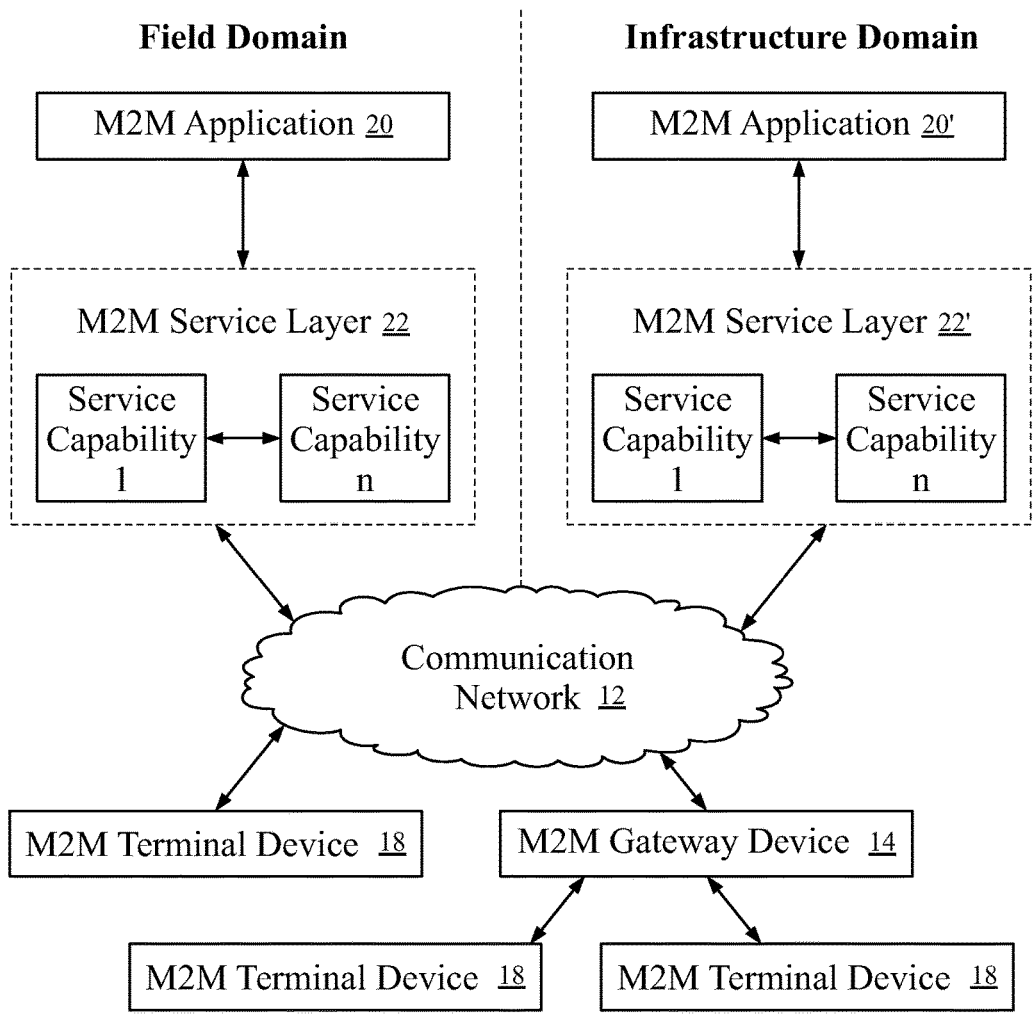
FIG. 32B is a diagram that illustrates an exemplary M2M service layer in which one or more disclosed embodiments may be implemented.
Figure 32C:
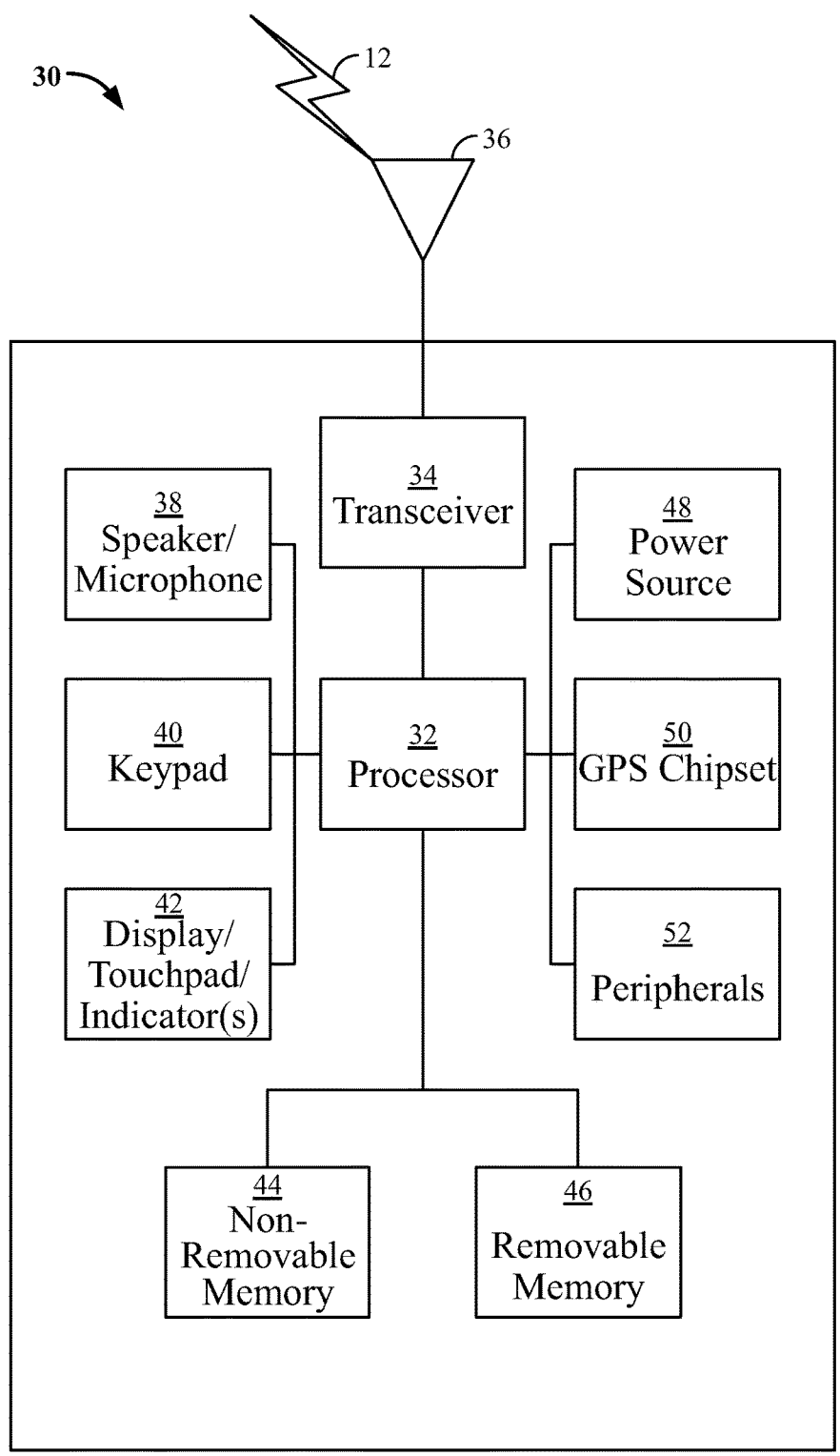
FIG. 32C is a diagram that illustrates an exemplary device, such as a UE or other device.
Figure 32D:
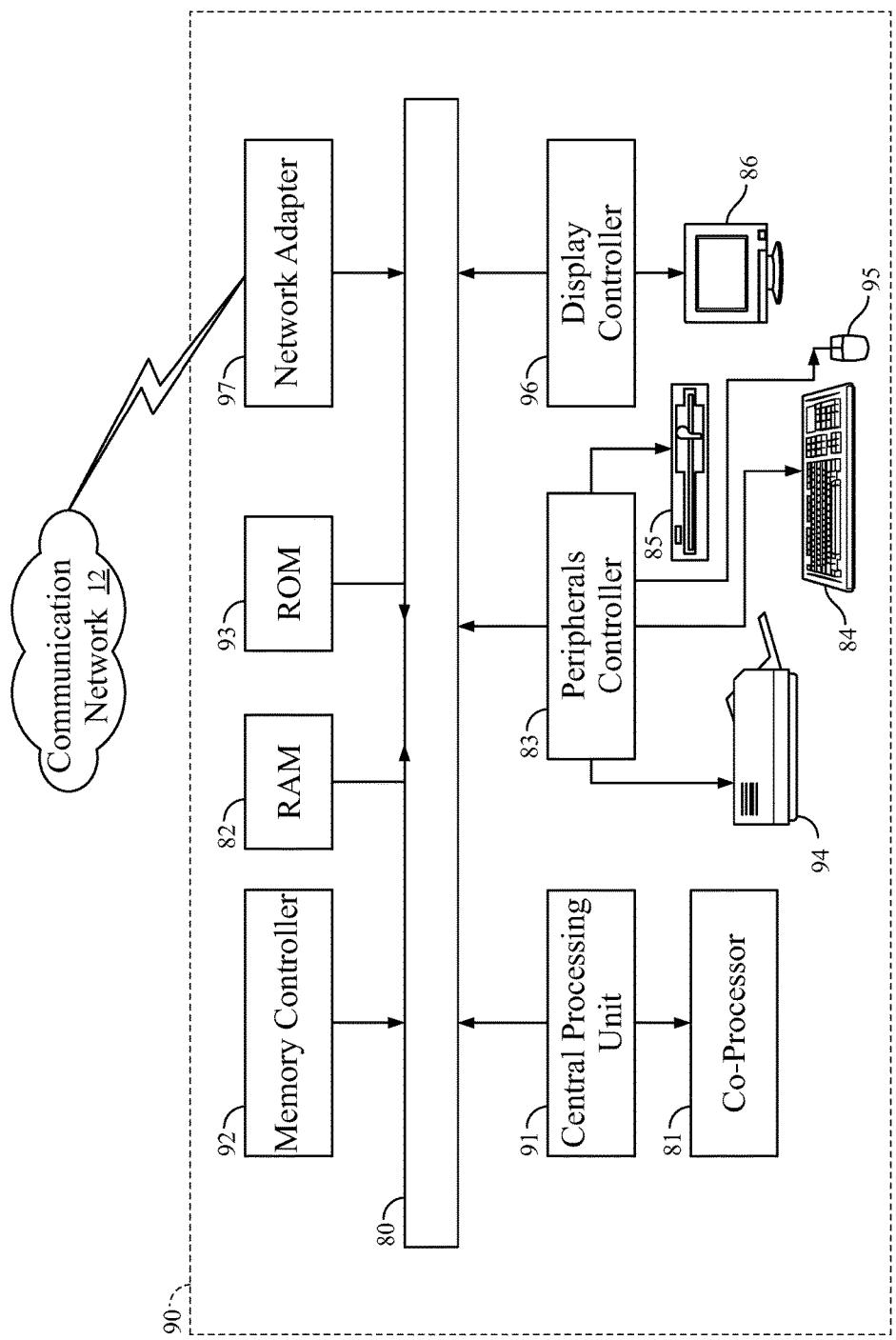
FIG. 32D is a diagram illustrates an exemplary computer system or server that may be used to implement any of nodes or logical entities of disclosed embodiments.

It is understood that the entities performing the steps illustrated in FIG. 11 are logical entities that may be implemented in the form of software (i.e., computer-executable instructions) stored in a memory of, and executing on a processor of, a network node or computer system such as those illustrated in FIG. 32C or FIG. 32D. That is, the method(s) illustrated in FIG. 11 may be implemented in the form of software (i.e., computer-executable instructions) stored in a memory of a network node, such as the node or computer system illustrated in FIG. 32C or FIG. 32D, which computer executable instructions, when executed by a processor of the node, perform the steps illustrated in FIG. 11. It is also understood that any transmitting and receiving steps illustrated in FIG. 11 may be performed by communication circuitry of the node under control of the processor of the node and the computer-executable instructions (e.g., software) that it executes.

Figure 13:
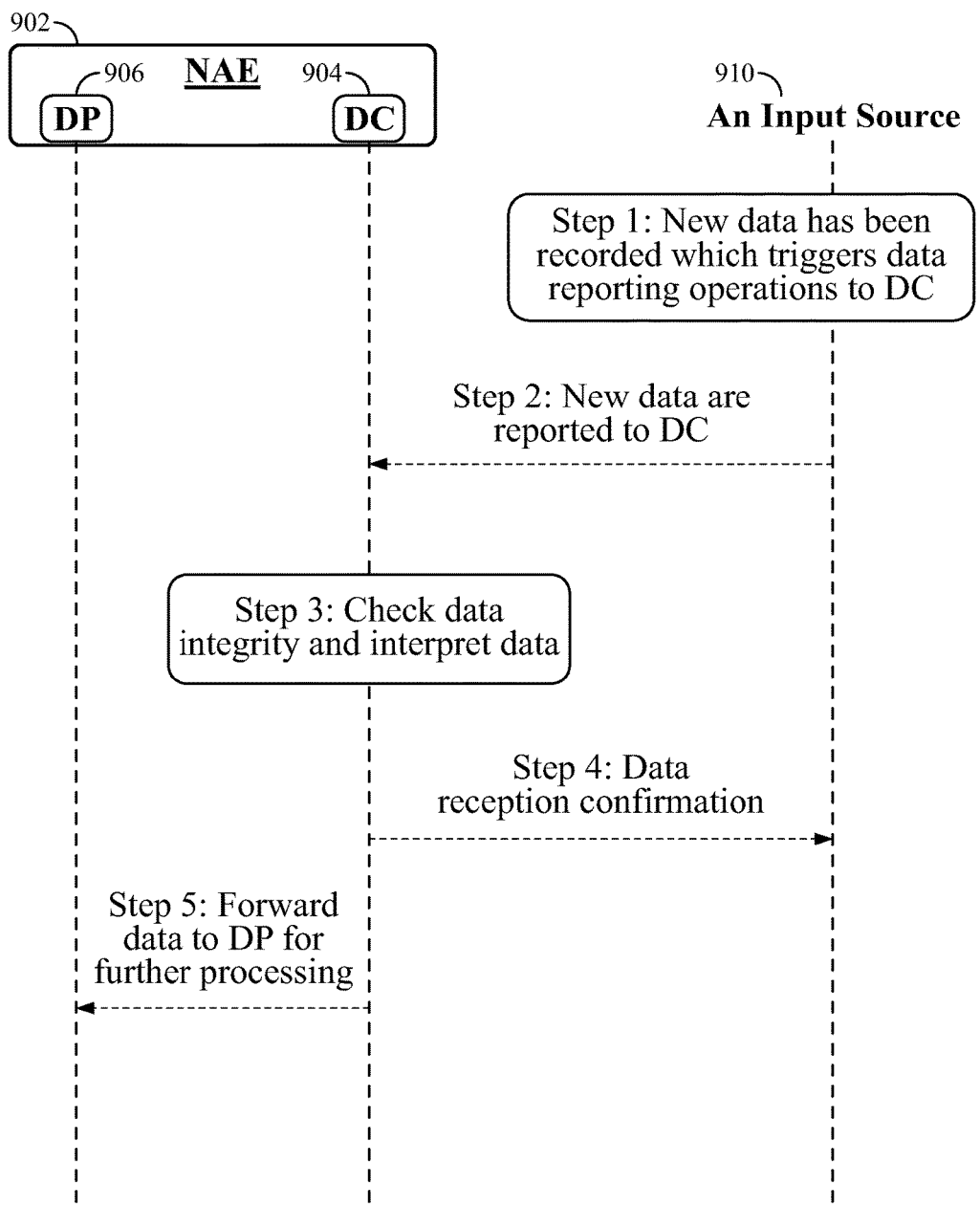
FIG. 13 is a flow chart that illustrates an exemplary procedure for data collecting and reporting.

FIG. 13 is a flow chart that illustrates an exemplary procedure for data collecting and reporting. Once the data collection relationship has been established, DC 904 can receive data reporting from the sources.

In step 1 of FIG. 13, as mentioned in the last section, some triggers (e.g., when a specific piece of data has been reported, which is interested by DC) can be defined inside the sources (See Step 7 of FIG. 11). Accordingly, once the new data has been recorded which is interested by DC, it can trigger a data reporting operation.

Figure 14:
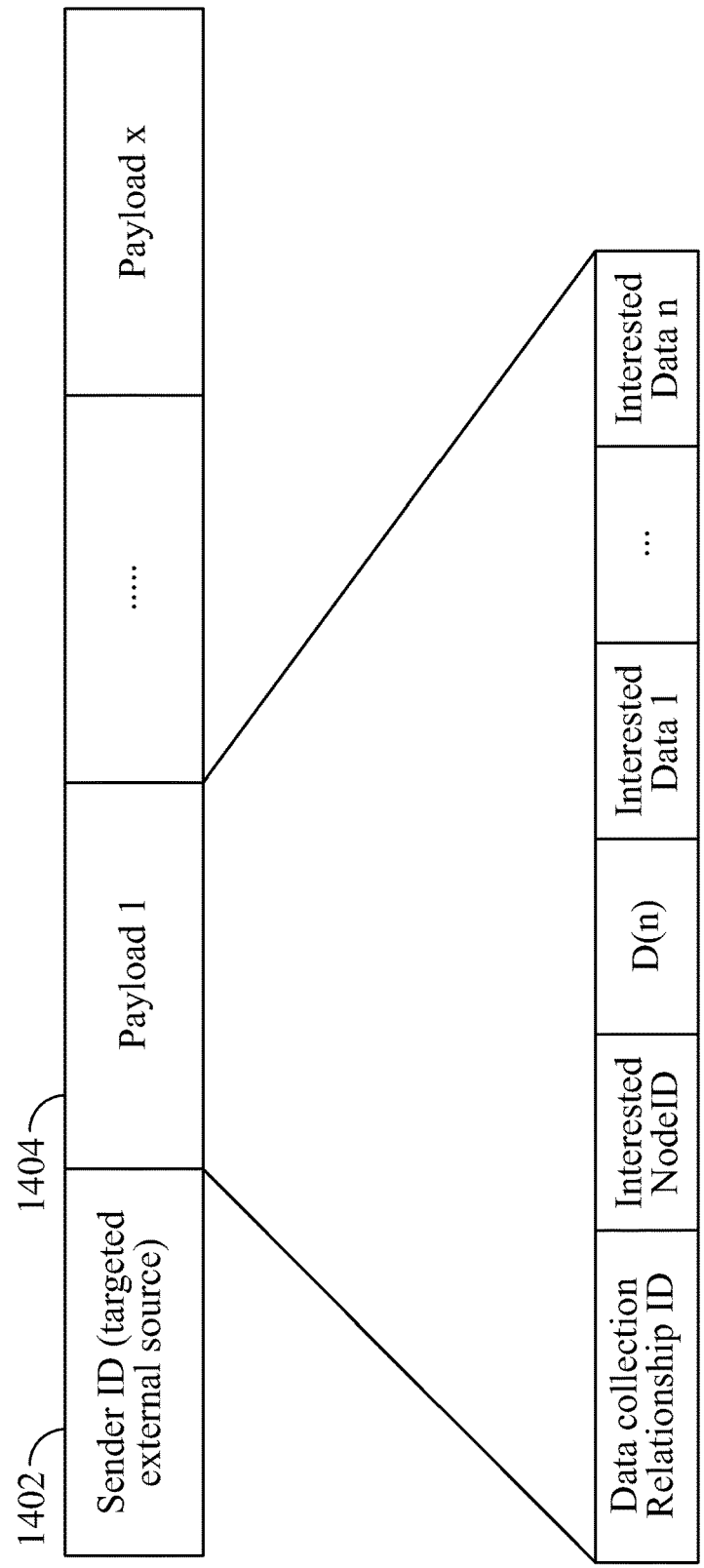
FIG. 14 is a diagram that illustrates a generic message structure for the data reporting message.

In step 2 of FIG. 13, the new data is sent from the source to DC. FIG. 14 is a diagram that illustrates a generic message structure for the data reporting message used in this step. In particular, the SenderID 1402 can indicate where the data comes from. The Payload part 1404 also carries a list of sub-messages (each of them corresponds to a data reporting record for an on-going data collection relationship). For each of sub message (shown in the bottom of FIG. 14.), it includes the following information: 1) dataCollectionRelationshipID indicates which existing data relationship the data is related to; 2) NodeID indicates the data is related to which node; 3) the fields after the 'D' domain are the n number of interested data. A concrete embodiment of a sub message illustrating how to collect data from existing CSFs at oneM2M service layer is discussed below. Alternately, instead of putting data related to various interested nodes in one message as shown in FIG. 14 the source can aggregate the data for each interested node and each message only includes the data related to one node.

In step 3 of FIG. 13, after receiving a new data from a source, DC 904 can first check the data integrity and then interpret data by abstracting the useful information.

In step 4 of FIG. 13, the DC 904 sends back a confirmation to the source for the successful data reception operation.

In step 5 of FIG. 13, the DC 904 also forwards the data to DP 906 for further processing.

It is understood that the entities performing the steps illustrated in FIG. 13 are logical entities that may be implemented in the form of software (i.e., computer-executable instructions) stored in a memory of, and executing on a processor of, a network node or computer system such as those illustrated in FIG. 32C or FIG. 32D. That is, the method(s) illustrated in FIG. 13 may be implemented in the form of software (i.e., computer-executable instructions) stored in a memory of a network node, such as the node or computer system illustrated in FIG. 32C or FIG. 32D, which computer executable instructions, when executed by a processor of the node, perform the steps illustrated in FIG. 13. It is also understood that any transmitting and receiving steps illustrated in FIG. 13 may be performed by communication circuitry of the node under control of the processor of the node and the computer-executable instructions (e.g., software) that it executes.

Figure 15:
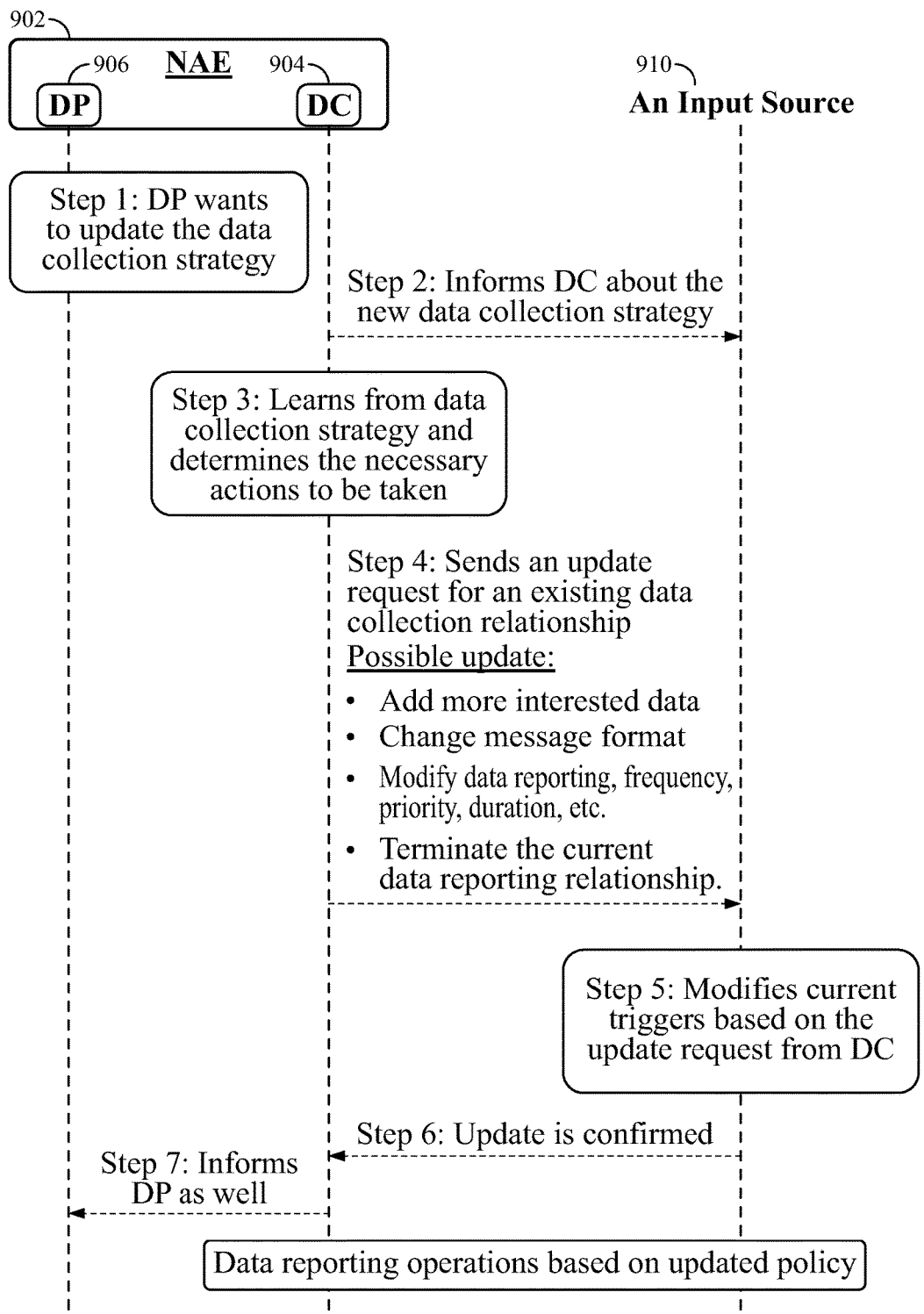
FIG. 15 is a flow chart that illustrates an exemplary procedure for data collection relationship and policy updating.

FIG. 15 is a flow chart that illustrates an exemplary procedure for data collection relationship and policy updating. It is possible that DC 904 may already have an ongoing data collection relationship with a source but the necessary modifications are needed in order to meet the newly received data collection strategy. In such a case, DC 904 just only needs to send out an update request. This section presents the corresponding procedure for data collection relationship and policy update.

Steps 1-3 of FIG. 15 are as same as the Steps 1-3 of FIG. 11.

In step 4 of FIG. 15, when it is required to make update on an existing data collection relationship (i.e., the Case 2 as discussed in the Step 3 of FIG. 11), DC 904 will send an update request to the source. In the meantime, instead of sending all the information, DC 904 only needs to send dataCollectionRelationshipID, associated with the required changes. Taking an example from oneM2M service layer, DC 904 may indicate a session management CSF that it needs to extend the data collection duration for an interested node (e.g., CSE-1). In addition to that, the data collection update may require to collect more data elements, modify data reporting frequency, priority, or to terminate the current data collection relationship. In addition, the message format of an update request could be very similar with the one shown in FIG. 12 (only need to adding a field in the sub-message to include dataCollectionRelationshipID), therefore, it is not shown here for concise presentation.

In step 5 of FIG. 15, once the source accepts the update request, it also makes modifications on the corresponding triggers to reflect such changes. Note that, it is possible that for an update request, there could also be a negotiation process (as same as in FIG. 11) between DC 904 and the source before achieving a consistent Quality of Service (QoS) requirement agreement. FIG. 15 does not reflect this process.

In step 6 of FIG. 15, once triggers have been successfully re-configured based on the update request, the source will send back a confirmation to DC 904.

In step 7 of FIG. 15, the DC 904 will also send back a confirmation to DP 908 for its awareness.

It is understood that the entities performing the steps illustrated in FIG. 15 are logical entities that may be implemented in the form of software (i.e., computer-executable instructions) stored in a memory of, and executing on a processor of, a network node or computer system such as those illustrated in FIG. 32C or FIG. 32D. That is, the method(s) illustrated in FIG. 15 may be implemented in the form of software (i.e., computer-executable instructions) stored in a memory of a network node, such as the node or computer system illustrated in FIG. 32C or FIG. 32D, which computer executable instructions, when executed by a processor of the node, perform the steps illustrated in FIG. 15. It is also understood that any transmitting and receiving steps illustrated in FIG. 15 may be performed by communication circuitry of the node under control of the processor of the node and the computer-executable instructions (e.g., software) that it executes.

Figure 16:
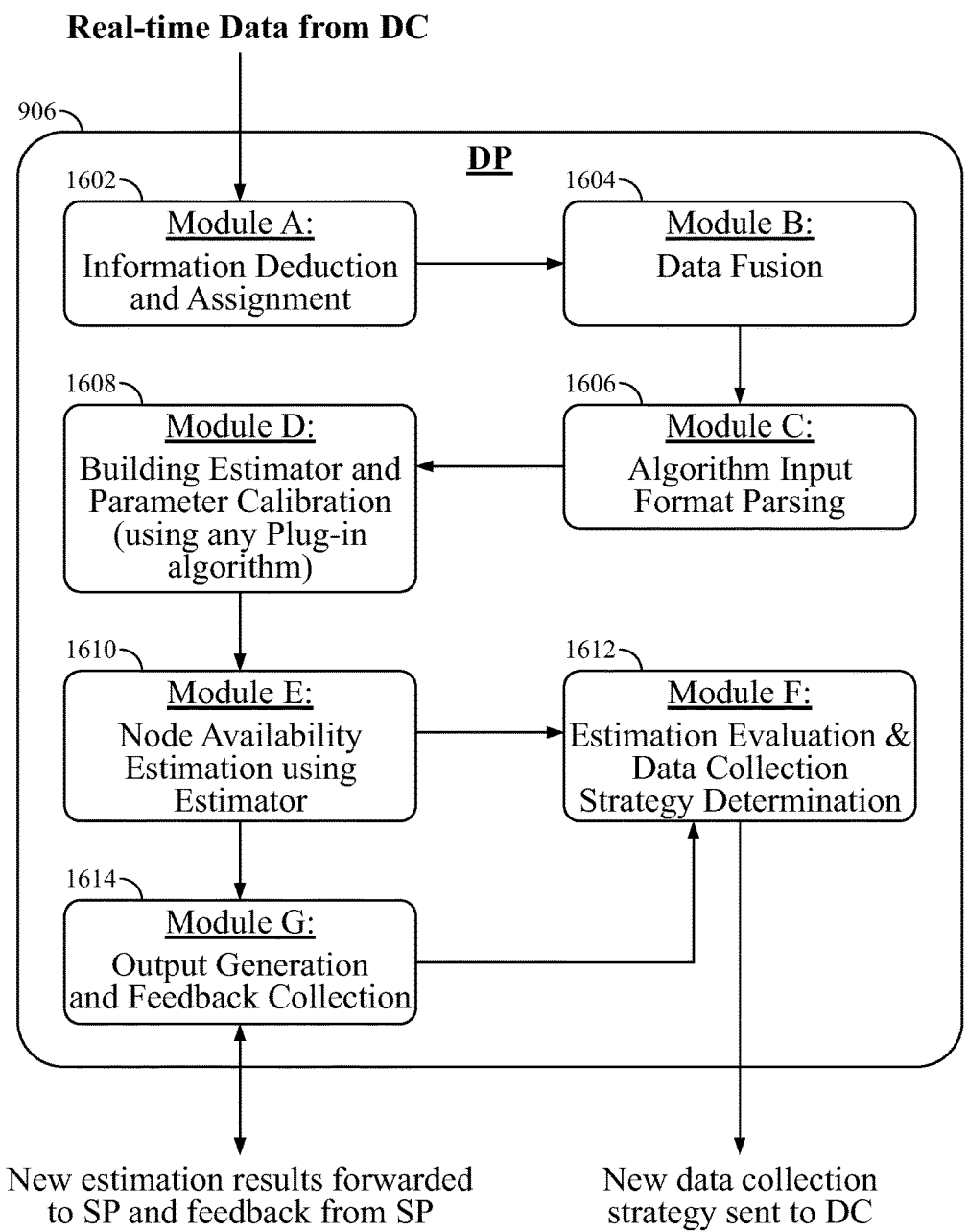
FIG. 16 is a diagram that illustrates an exemplary general architecture of a DP.

FIG. 16 is a diagram that illustrates an exemplary general architecture of a DP 906. It is understood that the functionality illustrated in FIG. 16, may be implemented in the form of software (i.e., computer-executable instructions) stored in a memory of, and executing on a processor of, a node of an M2M network (e.g., a server, gateway, device, or other computer system), such as one of those illustrated in FIG. 32C or 32D described below.

This exemplary architecture has a number of modules having different sub functionalities. DP 906 can estimate node availability based on the collected data from input sources. FIG. 16 also shows the information flow among different modules (shown as arrows). Those are all novel ideas proposed by this paper. In addition, the subsequent sections will introduce the design details of embodiments of each of modules to illustrate step-by-step how the node availability can be estimated. In particular, a specific technology is used as an example in order to introduce the details of each modules (e.g., the way of how to pre-process data, using polynomial model to build estimator, etc.), but it is worth noting that any technology or approach could be used for implementing each of modules of DP 906 and there is no generic approach Module A 1602 is the Information Deduction module. Module A 1602 can receive various real-time data from DC 904; this data can be converted to a normalized value (e.g., a Boolean value "0" or "1" to indicate the node availability) that can be used for building the estimator. For a given piece of data j related to an interested node i, $y_{i,j}(t)$ (a Boolean variable) is defined as the node availability at time unit $t \leq t_c$ ($t_c$ is denoted as the current time), which is specifically deduced by abstracting the information from data j. In order to determine the value for $y_{i,j}(t)$, a deduction process is needed to infer whether to set a "0" or a "1" for $y_{i,j}(t)$ based on the information in data j. Taking an example in oneM2M service layer, if data j (which is collected from a session management CSF) indicates that AE1 has been communicating with AE2 during [0, $t_1$], it may be deduced that AE1 is available during [0, $t_1$] by setting "1" to $y_{i,j}(t)$ for each of time t during [0, $t_1$]. Such a deduction process can be executed in a best-effort way, so it is possible that the real status could not be deduced correctly only based on a specific piece of data. Therefore, a corresponding data fusion process can be used to improve the information fidelity, which will be discussed in the next section.

After deducing a "0" or "1" value for variable $y_{i,j}(t)$ for node i based on the information included in the data j, a further deduction step in Module A 1602 is related to data re-use in the sense that a given data directly related to node i may also indirectly reflect the availability of other nodes. For example, if it is deduced that the physical node Device-1 is not available due to sleeping during [0, $t_1$], it can also be deduced that CSE-1 and AE-1 may not be available either if both of them are running on Device-1. As a result, one piece of data related to Device-1 can also be used for estimating the availability of logical nodes CSE-1 and AE-1.

Module B 1604 is the Information Fusion module. The focus of Module B 1604 is still on node i's historical availability at one specific time unit $t \le t_c$. In fact, for a given time unit $t \le t_c$, there could be many pieces of data (say W) that are related to the availability of node i. As a result, from each of such data, it has a corresponding $y_{i,j}(t)$ and the set of such $y_{i,j}(t)$ can be denoted by a list $Y_i(t)$, which is given by:

$$Y_i(t) = \{y_{i,j}(t)\} \text{ for } j=1,2,3 \ldots W \qquad (3)$$

For $Y_i(t)$, Module B 1604 will execute a data fusion operation (which could leverage any existing sophisticated plug-in technologies) by transforming the list $Y_i(t)$ to a single Boolean value, which will finally be regarded as the value of $y_i(t)$. For example, assuming $Y_i(t)$ has the content shown in Eq. (4), which is obtained based on 13 pieces of data related to the availability of node i at a time unit $t \le t_c$:

$$Y_i(t) = \{1, 0, 0, 0, 0, 0, 0, 0, 1, 0, 0, 0, 0\} \Rightarrow y_i(t) = 0 \qquad (4)$$

After the data fusion process, $Y_i(t)$ will be fused to a single "0", which is assigned to $y_i(t)$ because most of them indicate that node i is not available at time unit t.

Module C 1606 is the Input Format Parsing module for the algorithm used for building node availability estimator. For a given node i, by repeating the process as shown in the last section, a number of $y_i(t)$ can be decided for different previous time units (i.e., $t_c-1, t_c-2 \ldots t_c-k$) in Module B. Those historical values of $y_i(t)$ can be defined as an ordered list $L_i(t_c, k)$, which is given by:

$$L_i(t_c, k) = \{y_i(t_c-1), y_i(t_c-2), y_i(t_c-3) \ldots y_i(t_c-k-1), y_i(t_c-k)\} \qquad (5)$$

$L_i(t_c, k)$ now is an almost-ready input for the estimator modeling algorithm. Note, it is possible that for some of historical time units, the value of $y_i(t)$ cannot be determined because for example no related real-time data can be collected from DC 904. In the meantime, depending on the input format requirements of algorithm used in Module D 1608 for building the estimator, Module C needs to parse $L_i(t, k)$ to the required format. For example, $L_i(t, k)$ could be directly input into the algorithm as a string, as a table or as a 2-tuple list, etc.

Module D 1608 is the Building Node Availability Estimator module. Module D 1608 job is to build the node availability estimator (i.e., the function $f_i(t)$ for node i as defined in Eq. (1) in the sense that given a number of historical availability information (i.e., $L_i(t, k)$ as discussed in the previous section), Module D 1608 is to determine the values for the parameters (i.e., $a_n, a_{n-1}, \ldots a_1, a_0$) of function $f_i(t)$.

Here, we just show a simple example for illustrating how to build an estimator, which re-uses the previous example. It is observed that node i has the following historical availability schedule that during the past 20 time units, it slept for 4 time units and then waken up for another 6 time units before going to sleep again. In other words, the ordered list $L_i(t_c, k)$ as defined in Eq. (5) has the following content:

$$L_i(t_c, 20) = \{0, 0, 0, 0, 1, 1, 1, 1, 1, 1, 0, 0, 0, 0, 1, 1, 1, 1, 1, 1\} \qquad (6)$$

To build an estimator, first a candidate/prototype function needs to be selected and the major consideration is that the prototype function should generally have the similar trend as that of the historical data. For example, if the historical data reflects a linear trend, then the prototype function should also have a linear expression. In our example, since the node historical availability schedule reflects some periodicity and $y_i(t)$ is a boolean-valued function, a following prototype function shown in Eq. (7) can be selected (In reality, how to choose a prototype function largely depends on domain knowledge/experience.)

$$y_i(t) = \frac{a_0 + (-1)^{\max\{a_1, \min\{a_2, (t \bmod a_3) - a_4\}\}}}{a_5} \qquad (7)$$

The parameters in the prototype function in Eq. (7) are not determined at this time point and remember that MOD is the modulo operation as discussed in Eq. (2). Next, by utilizing the historical data, a certain amount of algorithm iterations will be executed before determining the values for all parameters in Eq. (7), i.e., $a_0, a_1, \ldots a_5$ (This iteration process is often run by the off-the-shelf software, e.g., Matlab, etc). In particular, the value selection principle is that when searching for the optimal values for those parameters during the iteration process, we can evaluate how a specific function curve fits the historical data. For example, for a candidate function having a specific parameter setting, we need to measure the deviation between the calculated node availability for the historical time units (i.e., $t_c-1, t_c-2 \ldots t_c-k$) output by the candidate function (denoted by $y_i\sim(t_c-1), y_i\sim(t_c-2) \ldots y_i\sim(t_c-k)$), and the real values of the historical node availability, i.e., $y_i(t_c-1), y_i(t_c-2) \ldots y_i(t_c-k)$ as shown in Eq. (6). Last, a certain parameter setting will be the desirable one in the sense that it has the minimum summed deviations for all the historical time units, which is shown in Eq. (8) (Simply speaking, this function is the one having the best fitting results for the historical data):

$$\text{Minimize} \sum_{j=1}^{k} |y_i(t_c - j) - y_i(t_c - j)| \qquad (8)$$

After the values of parameters are determined, the prototype function will now become an estimator (as shown in right part of Eq. (9), in which all the parameters appeared in Eq. (7) have the numerical values):

$$y_i(t) = \frac{a_0 + (-1)^{\max\{a_1, \min\{a_2, (t \bmod a_3) - a_4\}\}}}{a_5} \rightarrow y_i(t) = \frac{1 + (-1)^{\max\{1, \min\{2, (t \bmod 10) - 4\}\}}}{2} \qquad (9)$$

In fact, such an estimator building process can be time-consuming and may require significant computing resources for obtaining desirable results in terms of an accurate estimator $f_i(t)$. Therefore, in order to speed up the estimator building process, an incremental building approach is always suggested. To be more precise, instead of determining the values for the parameters of $f_i(t)$ by starting from the scratch, the existing estimator $f'_i(t)$ (if exists, which is built based on the older history data), could be as a basis such that the values of parameters in $f'_i(t)$ can be calibrated by combining the newly received data from DC 904 and finally upgrade f'$_i$(t) to a new estimator f$_i$(t). In addition, during the estimator building, each round of algorithm iteration may take significant time, therefore, Module D 1608 will only initiate a new estimator building process only when it is necessary.

Module E 1610 is the Node Availability Estimating module. After Module D 1608 yields an estimator f$_i$(t) for node i, Module E 1610 will use the estimator to estimate the availability of node i for t≥t$_c$ (remember that t$_c$ is the current time unit). Since y=f$_i$(t) as defined in Eq. (1) is a concrete function of t and y is a Boolean variable to denote the node availability, by inputting a t, the output of f$_i$(t) will be the estimated availability of node i at that time unit.

Figure 17:
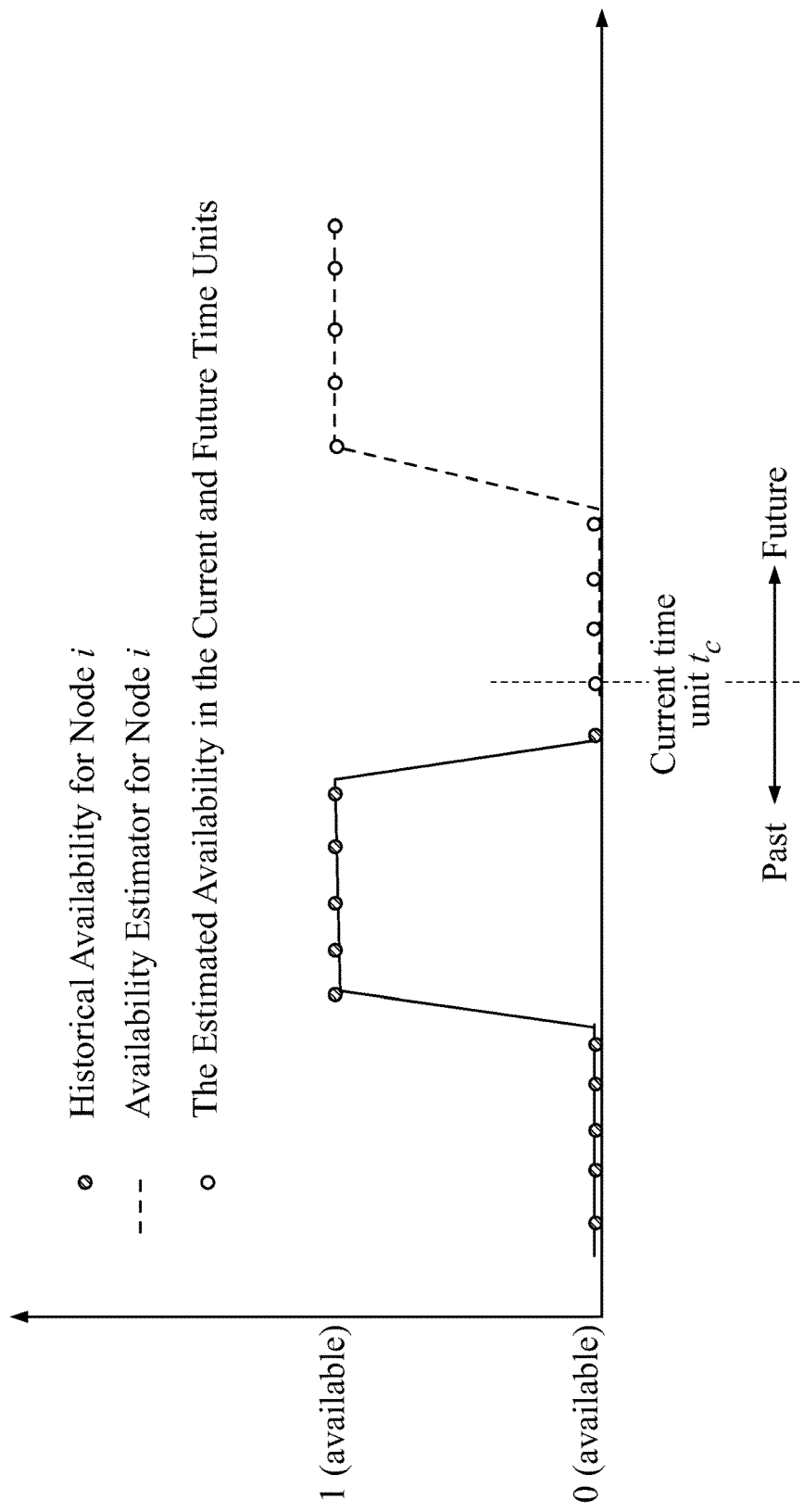
FIG. 17 is a diagram that illustrates a simple example of a constructed node availability estimator function.

To illustrate the major ideas of Modules D 1608 and E 1610, FIG. 17 shows a simple example explaining the corresponding process for a given node i. As shown in the figure, based on a list of historical availability data (denoted by blue spots) in the past time units (which are obtained from Module C 1606), an estimator can be built, which is shown as the solid curve in the FIG. 17. In the meantime, the dash red curve is extended from the solid part by inputting the future time units, i.e., the green spots on the red curve are the estimated availability for the future time units (in reality, the estimator may be only accurate for estimating availability for the next one or several time units).

Module F 1612 is the Estimator Evaluation and Data Collection Strategy Determination module. It should be noted that there are several factors that could affect the accuracy of the node availability estimation. First, if Module D 1608 lacks enough historical node availability input (e.g., a lot of node availability data is missing for many past time units), the estimator may be built with the intrinsic defect in terms of inaccuracy. Second, for a given node i and a given time unit t, since different pieces of data collected by DC 904 can have different opinions on node availability and Module B 1604 is designed to fuse the those different opinions, it is very possible that there could be errors when deducing historical node availability due to various noise or bias, etc. Last, even if assuming all the historical availability data is accurate and also sufficient, this does not necessary mean that the corresponding estimator f$_i$(t) (built by Module D 1608) can still be accurate to estimate node availability for the future time units, because it heavily depends on the performance of the algorithm or approach used for building the estimator.

Therefore, with an estimator f$_i$(t), an estimated node availability result can be associated with a confidence value, which could be a decimal value between 0 and 1. On one hand, if some estimated results (e.g., the availability about node CSE-1) have a very low confidence value, Module F 1612 in the DP 906 will hint the DC 904 to collect more data related to CSE-1 (by indicating such demand in the next data collection strategy) in order to improve the confidence of the estimated availability of CSE-1. On the other hand, Module F 1612 also can collect feedback from SP 908, from where the service clients query the estimated node availability for their own purposes. For example, SP 908 may report that the estimated availability of CSE-2 needs to be improved because currently lots of clients cannot benefit from this information due to low confidence. Alternatively, the SP 908 may report to Module F 1612 that a client tried to access Device-1 in a previous time interval (because the estimated availability provided by SP 908 showed that Device-1 was available), but the operation finally failed (i.e., the estimated availability is inaccurate). Overall, Module F 1612 will dynamically adjust the data collection strategy, which will be forwarded to DC 904 as a guideline as discussed in the previous section.

Module G 1614 is the Output Generation and Feedback Collection module. Module G 1614 will wrap the estimated results from Module F 1612 to the format that can be understood by the clients. Then, those results will be forwarded to SP 908. For example, the estimated availability of AE1 (having ID of 1232) between time units 10 and 20 could be described in the following format:

{NodeID=1232,Status: Available, Interval=[t=10, t=20], Confidence=0.55} (10)

In addition, Module G 1612 can also parse feedback information collected from SP 908 as mentioned earlier.

Figures 18, 19:
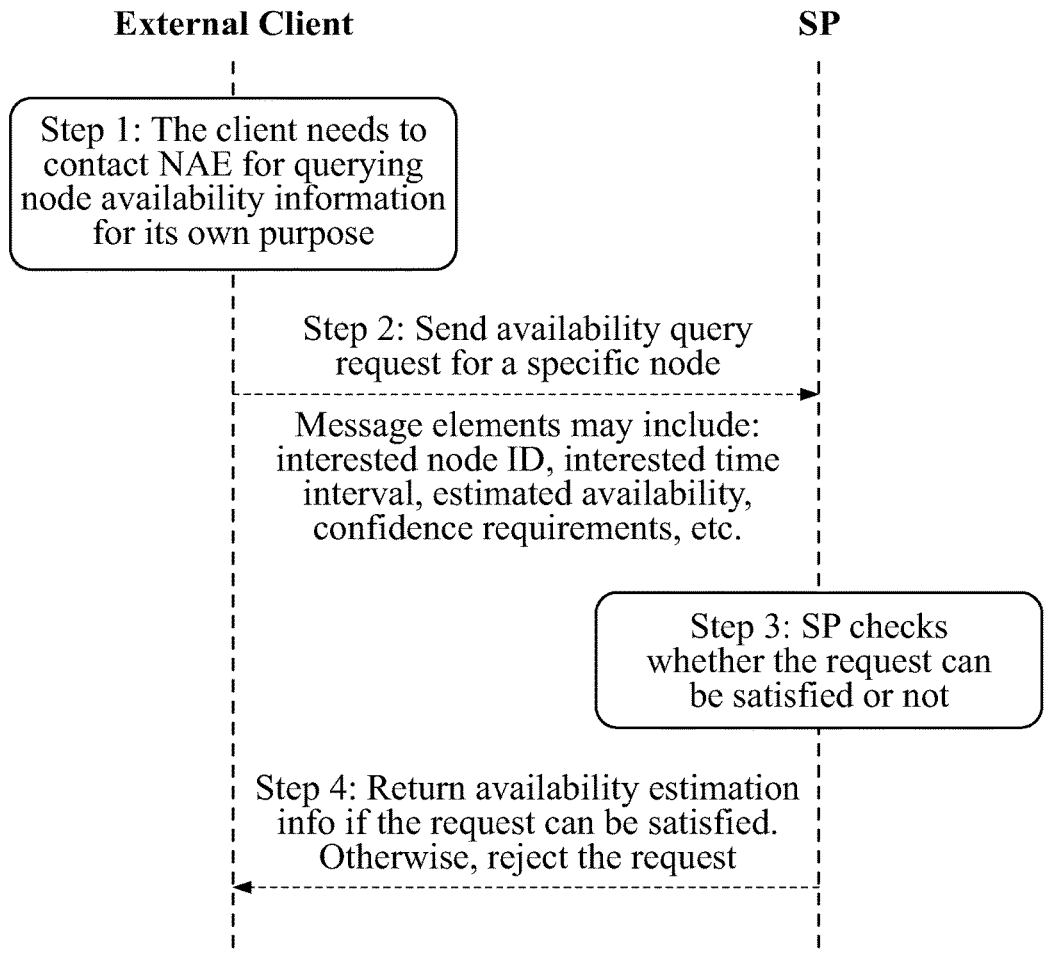
FIG. 18 is a flow chart that illustrates a method of service provisioning at an SP.
FIG. 19 is a diagram that illustrates an exemplary response message from a DC to a client.

After receiving the node availability estimation results from DP 904, SP 908 can provide such information as node availability estimation services to clients. FIG. 18 is a flow chart that illustrates a method of service provisioning at an SP 908, which is shown in FIG. 18.

In step 1 of FIG. 18, when a client needs to know the availability information for a given node for its own needs, it will contact NAE 902 for help if such information is not immediately clear.

In step 2 of FIG. 18, the client sends a query request to NAE 902. Typically, the message elements in the query request could include the following information (but not limited to):

Interested Node ID: the identifier of the node.
Interested Time Interval: the time period that the client is interested in.
Confidence Requirement: e.g., the minimum accepted confidence for the estimated availability information.

In step 3 of FIG. 18, after receiving the request from the client, NAE 902 will check its repository to see whether the request can be satisfied. The request will be reject if e.g., 1) SP 908 does not have any estimated availability information related to the interested node; or 2) the confidence of the estimated availability is too low to meet client's requirement.

An alternative use case in this example is that during Step 2, instead of querying the availability of a specific node, the client could just specify its need in terms of a node type. In other words, any node of that type can serve the client as long as it is currently available. Then, in Step 3, NAE 902 will be responsible for selecting a specific available node for serving this request.

In step 4 of FIG. 18, the DC 904 sends back the required information to the client if the request can be satisfied or send a reject notice with an explanation. In particular, the response message could have the structure as shown in FIG. 19 and an embodiment of such a message may have the similar information as the example shown in Eq. (10).

In addition to the above pull-based service provisioning, alternatively, a push-based service provisioning could also be designed in the sense that the client may establish a subscription for a given interested node to the NAE 902 and NAE 902 will periodically report any update on node availability to the client.

It is understood that the entities performing the steps illustrated in FIG. 18 are logical entities that may be implemented in the form of software (i.e., computer-executable instructions) stored in a memory of, and executing on a processor of, a network node or computer system such as those illustrated in FIG. 32C or FIG. 32D. That is, the method(s) illustrated in FIG. 18 may be implemented in the form of software (i.e., computer-executable instructions)

stored in a memory of a network node, such as the node or computer system illustrated in FIG. 32C or FIG. 32D, which computer executable instructions, when executed by a processor of the node, perform the steps illustrated in FIG. 18. It is also understood that any transmitting and receiving steps illustrated in FIG. 18 may be performed by communication circuitry of the node under control of the processor of the node and the computer-executable instructions (e.g., software) that it executes.

Figure 20:
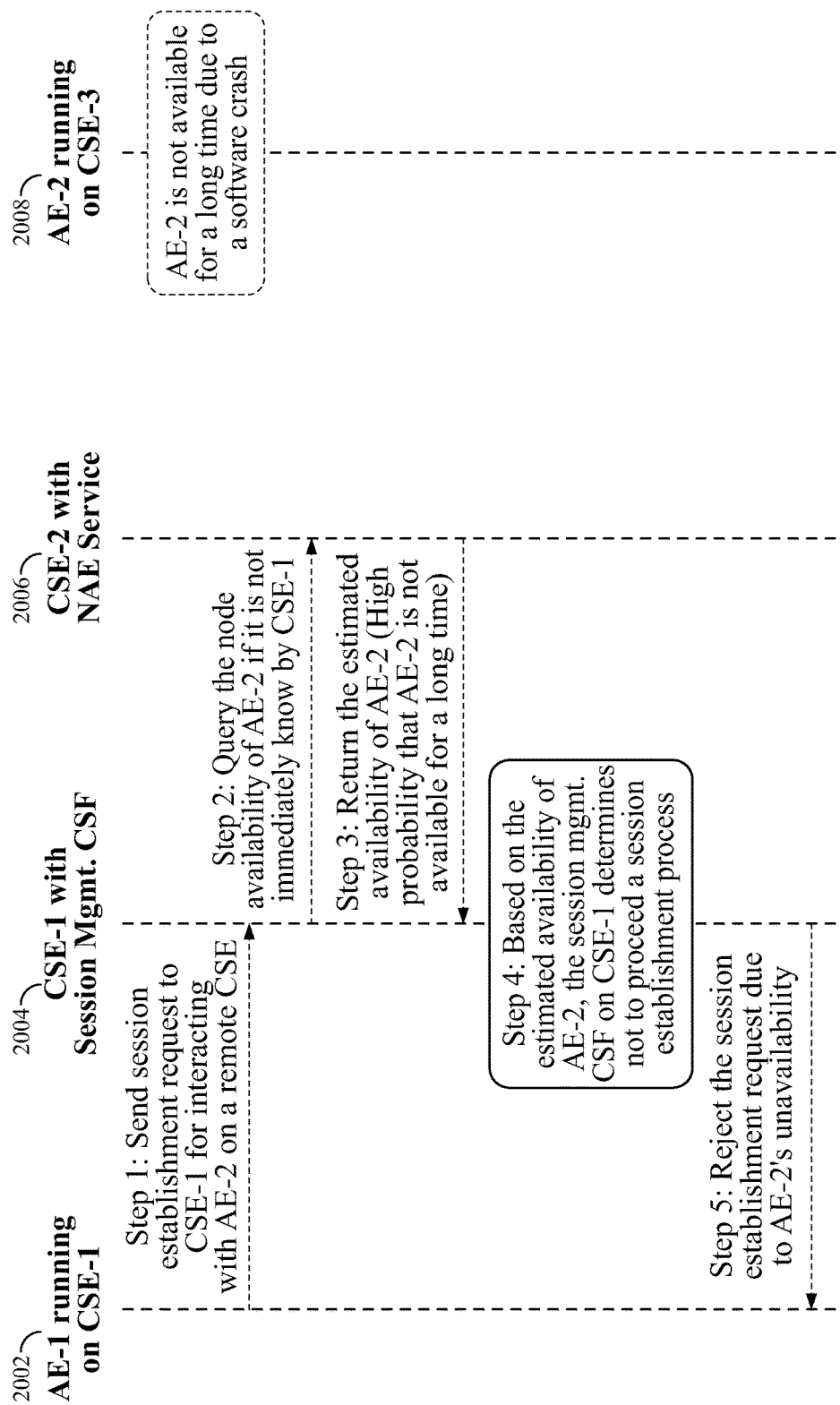
FIG. 20 is flow chart that illustrates a procedure for node availability-aware session establishment.

Based on the proposed new NAE 902 service at service layer, several value-added services can be enabled by NAE 902. FIG. 20 is flow chart that illustrates a procedure for node availability-aware session establishment. Once NAE 902 is implemented at service layer, it can support availability-aware session management service, and a concrete example is shown in FIG. 20 to illustrate the related procedure. As shown in FIG. 20, when AE-1 2002 running on CSE-1 2004 intends to interact with another AE-2 2006 running on a remote CSE-2 2008 (which in fact is not available due to e.g., a software crash), it first sends a session establishment request to its local CSE-1 2004. Instead of immediately initializing the session establishment process, CSE-1 2004 first evaluates the success probability for such an operation by querying the estimated availability of AE-2 2006 at CSE-2 2008 (which implements the NAE 902 service). From NAE 902, CSE-1 2004 is informed that it is high probability that AE-2 2006 is not available, based on which CSE-1 2004 will decide not to proceed. As a result, AE-1's request will be rejected directly from its local CSE-1 2004.

It is understood that the entities performing the steps illustrated in FIG. 20 are logical entities that may be implemented in the form of software (i.e., computer-executable instructions) stored in a memory of, and executing on a processor of, a network node or computer system such as those illustrated in FIG. 32C or FIG. 32D. That is, the method(s) illustrated in FIG. 20 may be implemented in the form of software (i.e., computer-executable instructions) stored in a memory of a network node, such as the node or computer system illustrated in FIG. 32C or FIG. 32D, which computer executable instructions, when executed by a processor of the node, perform the steps illustrated in FIG. 20. It is also understood that any transmitting and receiving steps illustrated in FIG. 20 may be performed by communication circuitry of the node under control of the processor of the node and the computer-executable instructions (e.g., software) that it executes.

Figure 21A:
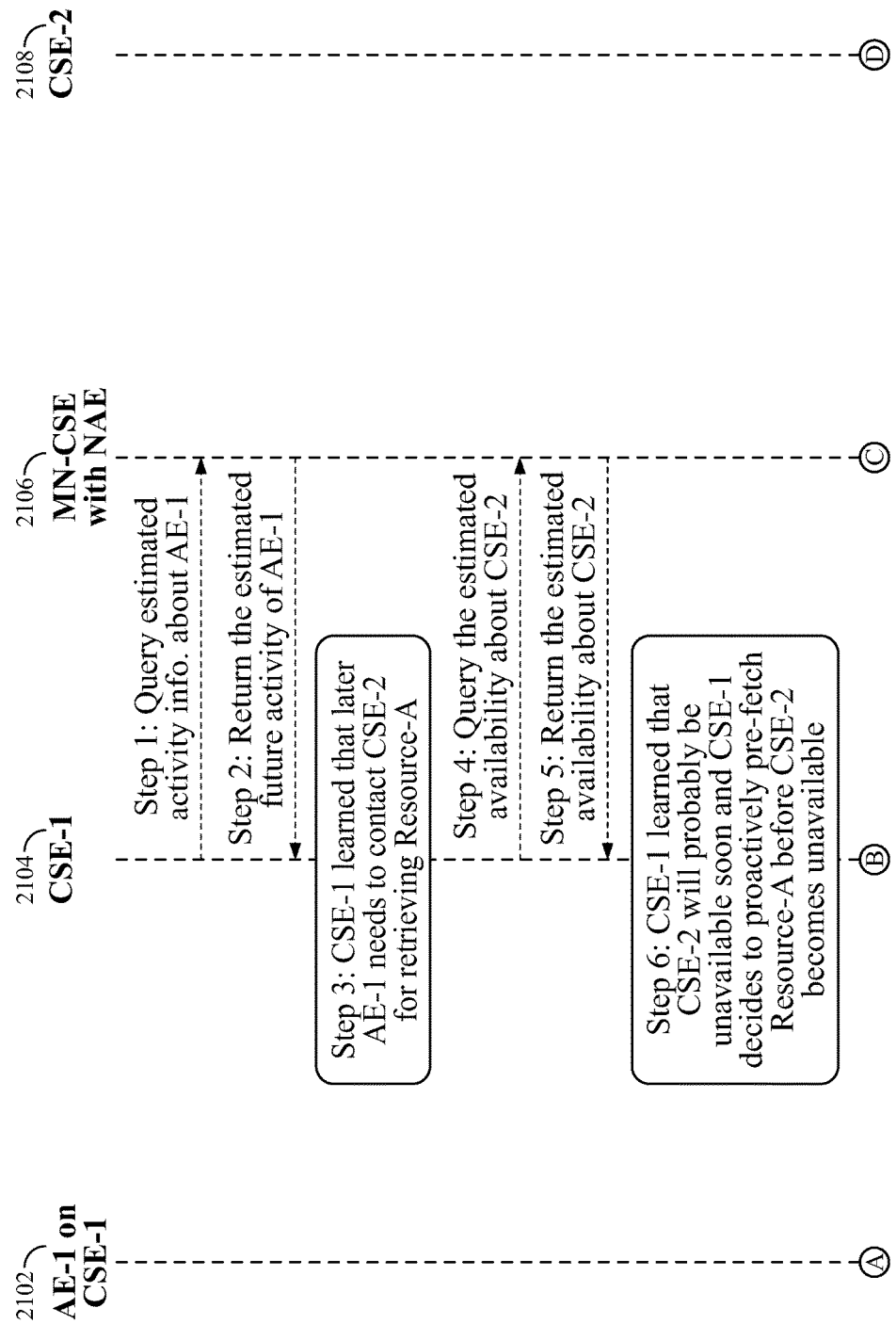
FIG. 21 is a flow chart that illustrates a procedure for intelligent store-and-forward prefetching.
Figure 21B:
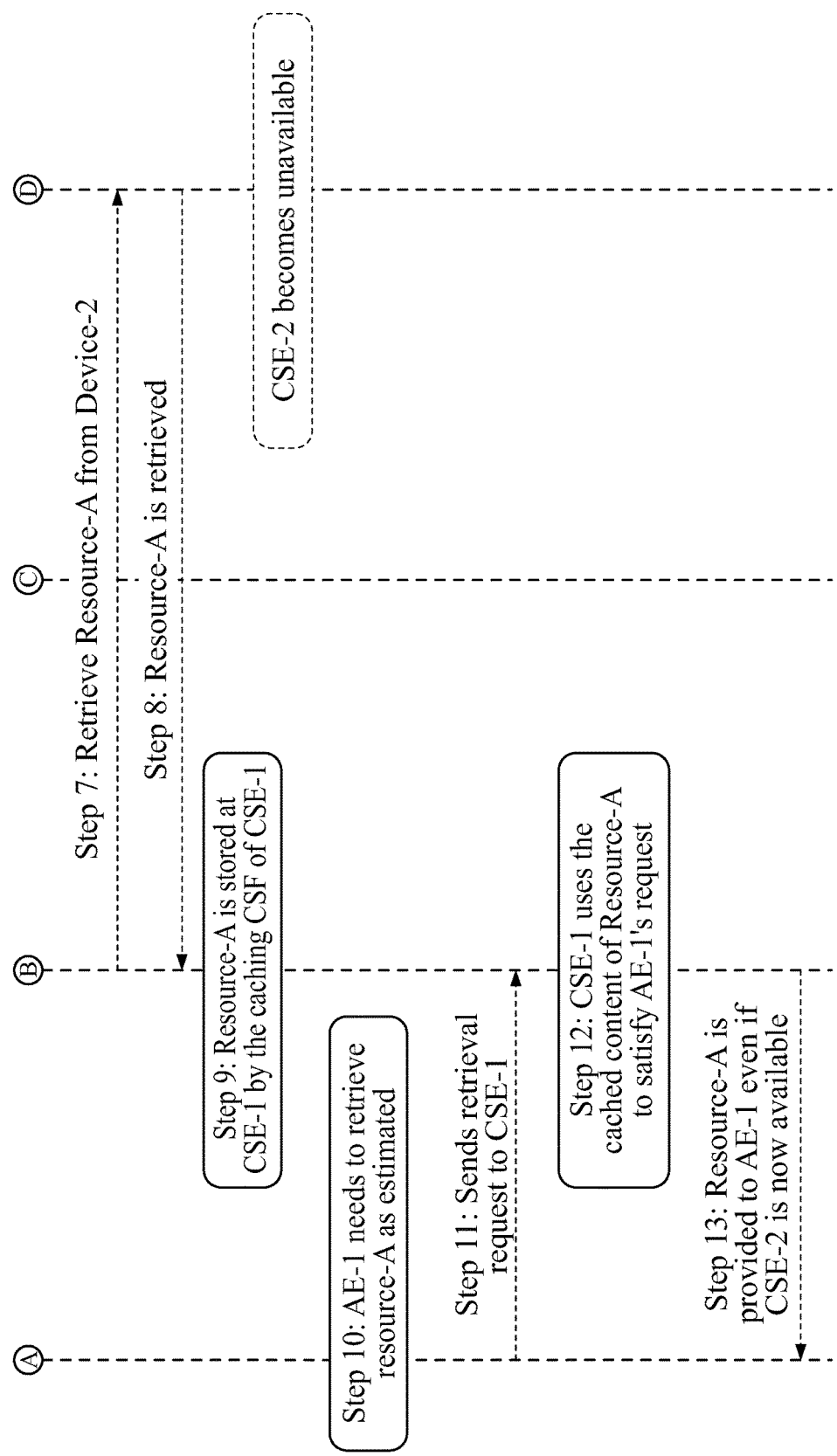

FIG. 21 is a flow chart that illustrates a procedure for intelligent store-and-forward prefetching. With the proposed NAE 902 service at service layer, more intelligent store-and-forward resource prefetching can be supported. A concrete example is shown in FIG. 21 to illustrate the related procedure. In fact, for a given logical node AE 2102, NAE 902 not only could estimate its availability, but also it is possible to estimate its activities behavior/pattern based on the data collected from DC 904. As shown in FIG. 21, CSE-1 2104 contacts NAE 902 running on MN-CSE 2106 by querying what is the estimated activity of AE-1 2102 (running on CSE-1) in the near future. With the estimated result returned from NAE 902, CSE 2104 learns that AE-1 2102 probably needs to fetch a Resource-A from a remote CSE-2 2106 around time unit $t_1$. Subsequently, CSE-1 2104 further queries NAE 902 and learns that CSE-2 2106 probably will not be available around time $t_1$. Accordingly, instead of reactively dealing with the unavailability event of CSE-2 2106, the caching CSF at CSE-1 2104 will proactively retrieve Resource-A from CSE-2 2106 before it becomes unavailable. As a result, at a later time, when AE-1 2102 sends the resource retrieval request to CSE-1 2104, CSE-1 2104 could directly use the pre-fetched content to satisfy AE-1's request. In such a sense, Resource-A is provided to AE-1 2102 even if CSE-2 2106 is now unavailable, in other words, with the help of NAE 902, the unavailability issue of CSE-2 2106 is hidden from AE-12102. If going back to re-examine the previous mentioned use case as discussed with respect to FIG. 8, such a value-added service can be used to solve the issue in FIG. 8 (in which a failure of one resource retrieval operation (on CSE-10) voids all the previous efforts (in terms of retrieving resources from CSE-1 to CSE-9). For example, a prefetching operation could be executed to retrieve the resource on CSE-10 so that all the required resources could be successfully retrieved by AE-1, as required by AE-1's operation requirement. Alternatively, another solution to the issue in FIG. 8 is that even without relying on the caching and prefetching mechanism discussed in the section, by only utilizing NAE 902, MN-CSE could return the availability information related to Device-1 to Device-10 to AE-1, and let AE-1 decide an appropriate schedule to retrieve all the resources on 10 devices.

It is understood that the entities performing the steps illustrated in FIG. 21 are logical entities that may be implemented in the form of software (i.e., computer-executable instructions) stored in a memory of, and executing on a processor of, a network node or computer system such as those illustrated in FIG. 32C or FIG. 32D. That is, the method(s) illustrated in FIG. 21 may be implemented in the form of software (i.e., computer-executable instructions) stored in a memory of a network node, such as the node or computer system illustrated in FIG. 32C or FIG. 32D, which computer executable instructions, when executed by a processor of the node, perform the steps illustrated in FIG. 21. It is also understood that any transmitting and receiving steps illustrated in FIG. 21 may be performed by communication circuitry of the node under control of the processor of the node and the computer-executable instructions (e.g., software) that it executes.

Figure 22A:
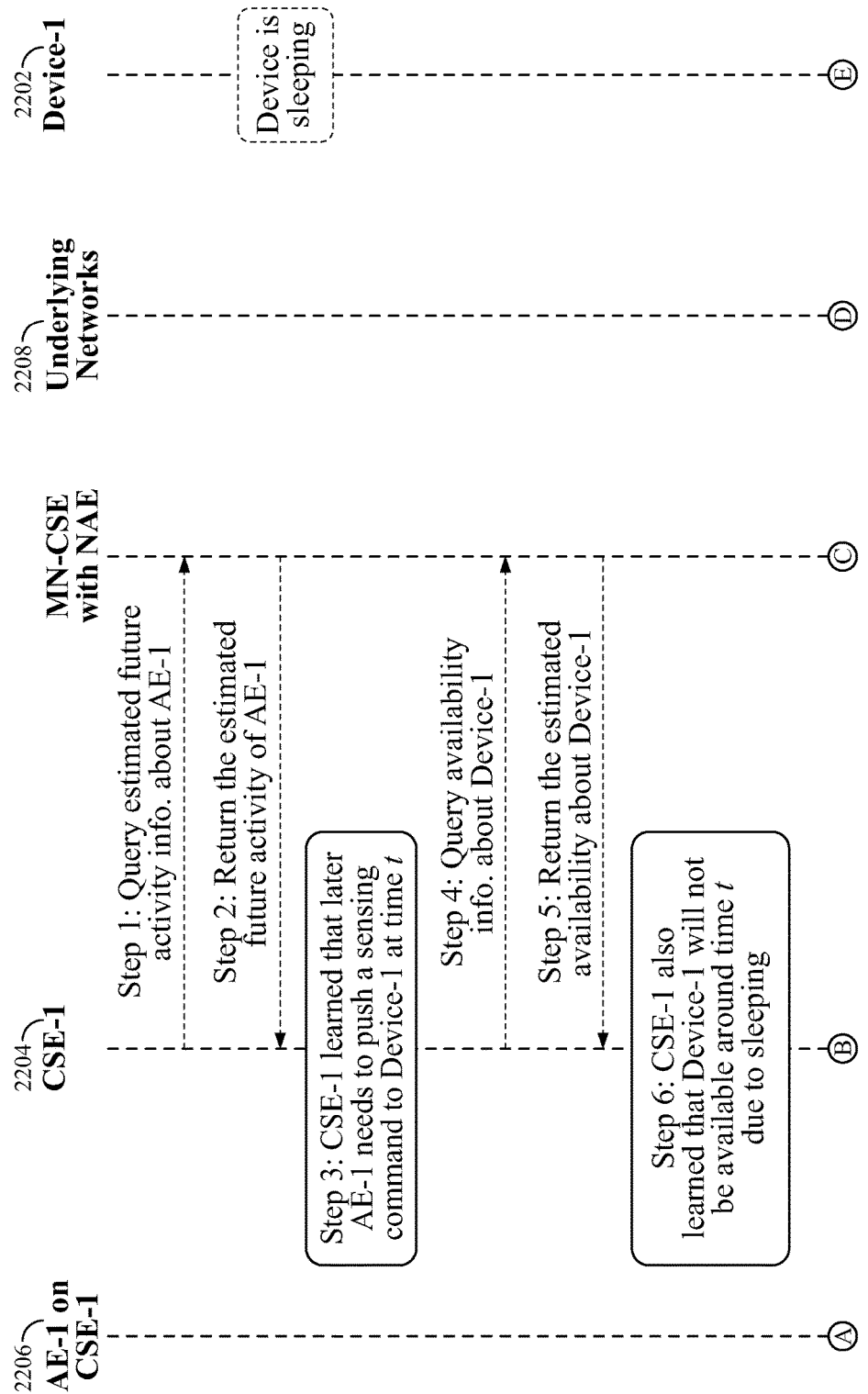
FIG. 22 is a flow chart that illustrates an exemplary procedure for proactive Node Triggering.
Figure 22B:
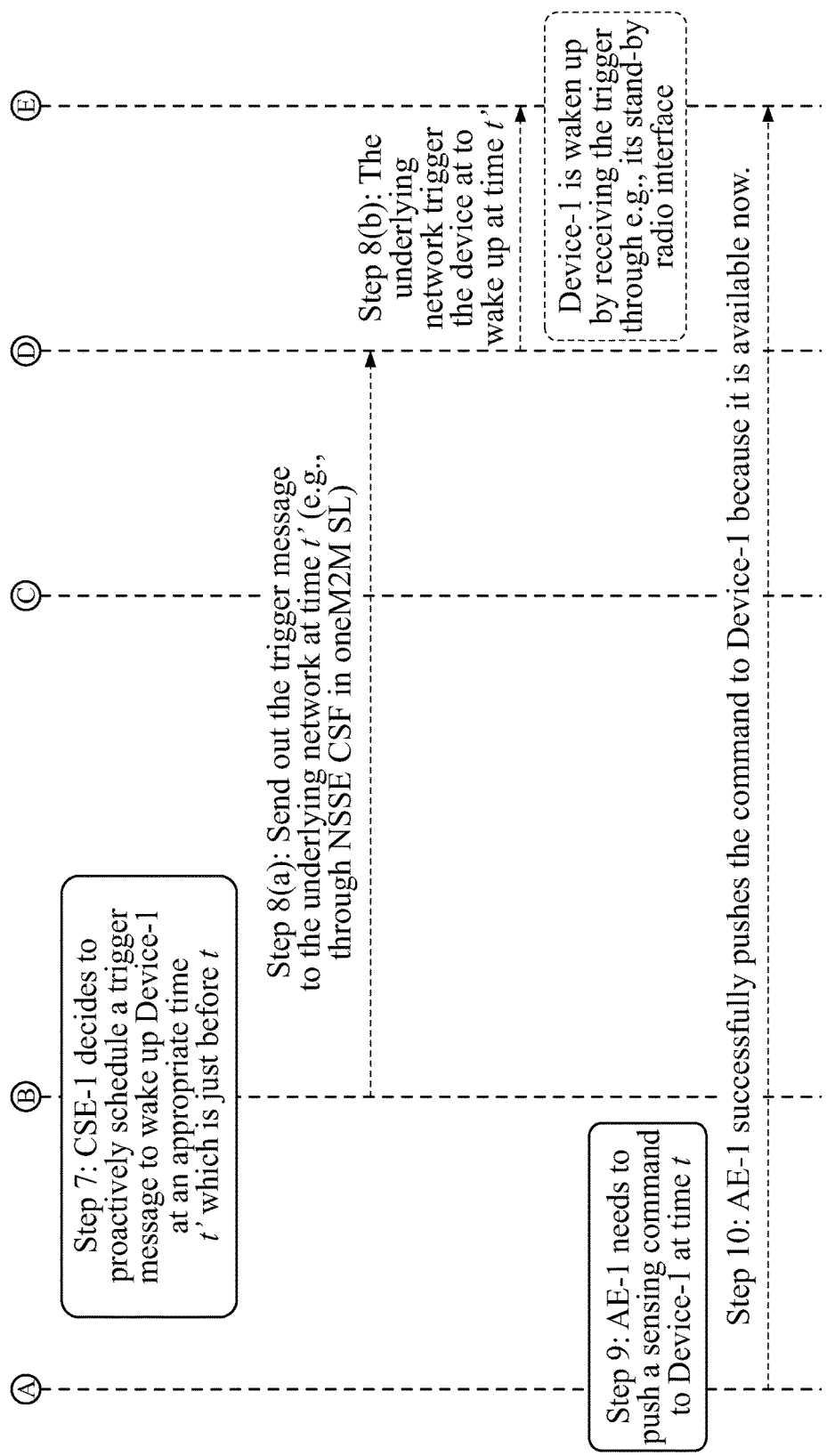

FIG. 22 is a flow chart that illustrates an exemplary procedure for proactive Node Triggering. It is understood that the entities performing the steps illustrated in FIG. 22 are logical entities that may be implemented in the form of software (i.e., computer-executable instructions) stored in a memory of, and executing on a processor of, a network node or computer system such as those illustrated in FIG. 32C or FIG. 32D. That is, the method(s) illustrated in FIG. 22 may be implemented in the form of software (i.e., computer-executable instructions) stored in a memory of a network node, such as the node or computer system illustrated in FIG. 32C or FIG. 32D, which computer executable instructions, when executed by a processor of the node, perform the steps illustrated in FIG. 22. It is also understood that any transmitting and receiving steps illustrated in FIG. 22 may be performed by communication circuitry of the node under control of the processor of the node and the computer-executable instructions (e.g., software) that it executes.

With the proposed NAE service 902 at service layer, proactive node triggering service can be enabled, and a concrete example is shown in FIG. 22 to illustrate the related procedure. As shown in FIG. 22, the first five steps are similar with the one shown in FIG. 21. The situation is that from NAE 902, CSE-1 learns that according to AE-1's application requirement, it needs to frequently (but not periodically in terms of a fixed work schedule) push sensing commands to Device-1 2202 for specific tasks, and the next pushing time is at a later time t. However, the NEA indicates that Device-1 2202 is probably not available around that time. Accordingly, instead of reactively triggering Device-1 2202 to wake up when receiving AE-1's pushing request at time t (which may lead to a potential delay), CSE-1 2204 may decide to proactively schedule a trigger message at an appropriate time unit (say t', which is just a bit of earlier than t) to the underlying networks 2208, by utilizing e.g., the Network Service Exposure, Service Execution and Triggering (NSSE) CSF in oneM2M service layer. Finally, the underlying networks will wake Device-1 2202 up. With such a trigger, Device-1 2202 could be immediately available at time t and a significant benefit is that Device-1 2202 does not have to be waken up too early, which leads to unnecessary energy consumption). As a result, not only AE-1 2206 successfully pushes the firmware to Device-1 2202, but also the energy efficiency purpose is achieved.

A client need not make their operation decisions totally or only based on the estimated node availability provided by NAE 902. The node availability estimation may not be accurate enough in terms of low confidence or sometime there is no such information ready for use. In order to make real intelligent decisions in such a case and remedy the possible estimation inaccuracy of NAE 902, more information can be considered for holistically evaluating node availability, including:

1) The cross-layer information reports from low layers may also have usefulness especially for those devices having very low duty cycles in the sense that in most of time they stay in sleep state. In such a case, it is possible that the estimated availabilities of those nodes provided by NAE 902 are always unavailable (in fact they did). However, at MAC/PHY layer, they could become available in a very short time slot to participate communications with other peers (e.g., using scheduled channel polling technology).

2) The context information is also useful for some cases. For example, if a client needs to contact a node, which is just within one-hop range and the NAE 902 estimated that node is not available (but with a very low confidence), the client may still try to contact the node (which may not induce much overhead) if network traffic is light (which may not worse the network traffic condition).

3) Latest runtime information. Since it always takes time for NAE 902 to collect data and then estimate node availability, it may have time lag effect to some extent. Accordingly, if a client has the latest evidence (for example, if it just overheard a broadcast packet from the targeted node), it may be good enough to conclude that the targeted node is probably available.

Overall, it is advised that when determining the node availability, not only the estimated results provided by NAE 902 but also other kinds of information as mentioned above needs to be taken into account. Depending on different scenarios and applications, clients will have different strategies to utilize the above information (e.g., in different priorities, having different weights, etc.).

Figure 23:
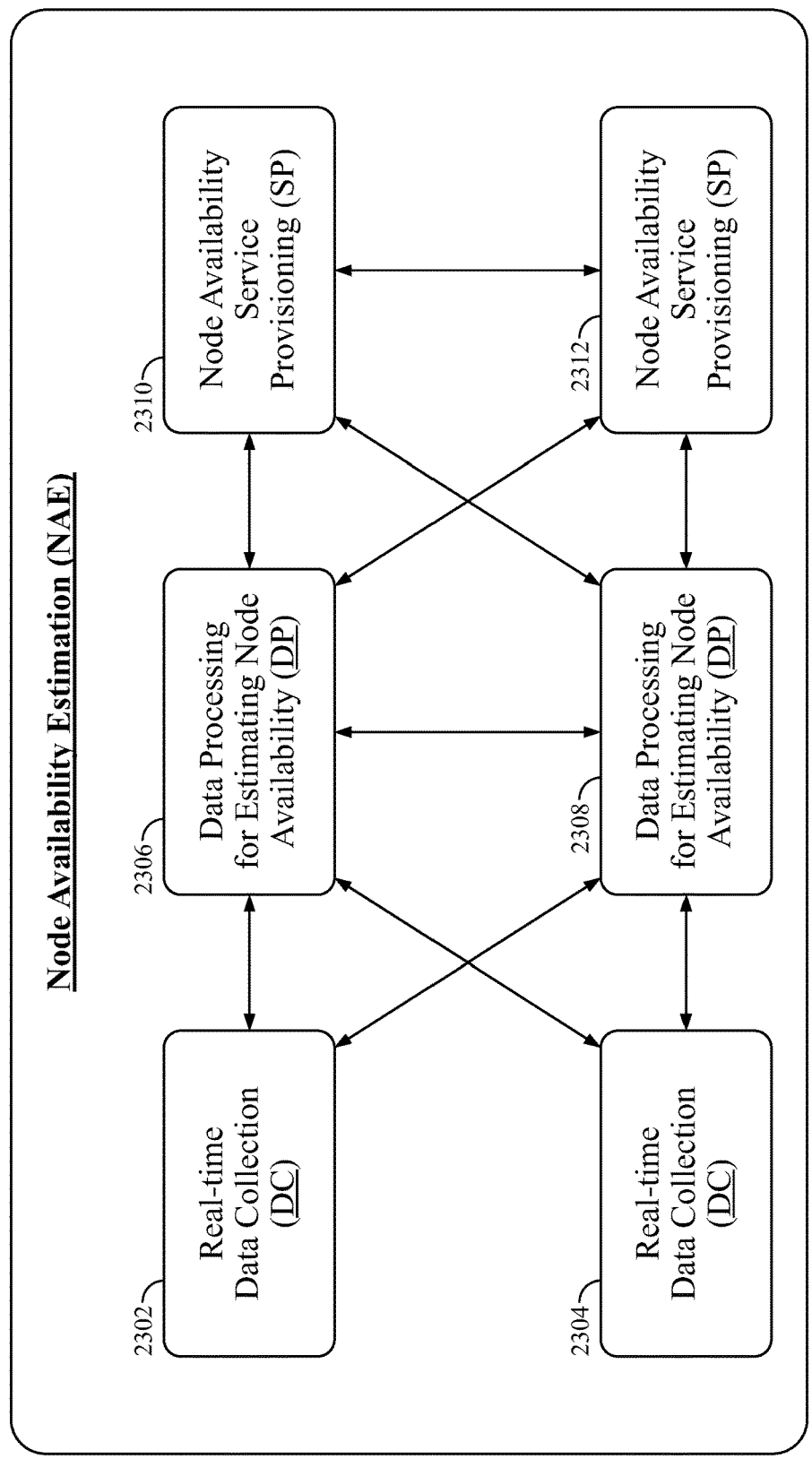
FIG. 23 is a diagram that illustrates interactions between multiple DCs, DPs and SPs.

FIG. 23 is a diagram that illustrates interactions between multiple DCs 2302 and 2304, DPs 2306 and 2308 and SPs 2310 and 2312.

It can be seen from FIG. 23 that each component can interact with multiple entities in the sense that any three components (in terms of one DC, one DP and one SP) could be regarded as a NAE if all of them collaborate together to achieve the node availability estimation function as discussed in the previous sections. For example, a DC 2202 can collect real-time data for multiple DPs 2306 and 2308, while a DP 2306 could provide estimation results to multiple SPs 2310 and 2312. The related procedures and the message structures for those interactions (i.e., DC and DP, DP and SP) are the same as the ones proposed in the previous sections. This section will mainly consider the interactions between two DPs 2306 and 2308 and two SPs 2310 and 2312.

It is understood that the functionality illustrated in FIG. 23, may be implemented in the form of software (i.e., computer-executable instructions) stored in a memory of, and executing on a processor of, a node of an M2M network (e.g., a server, gateway, device, or other computer system), such as one of those illustrated in FIG. 32C or 32D described below.

Figure 24:
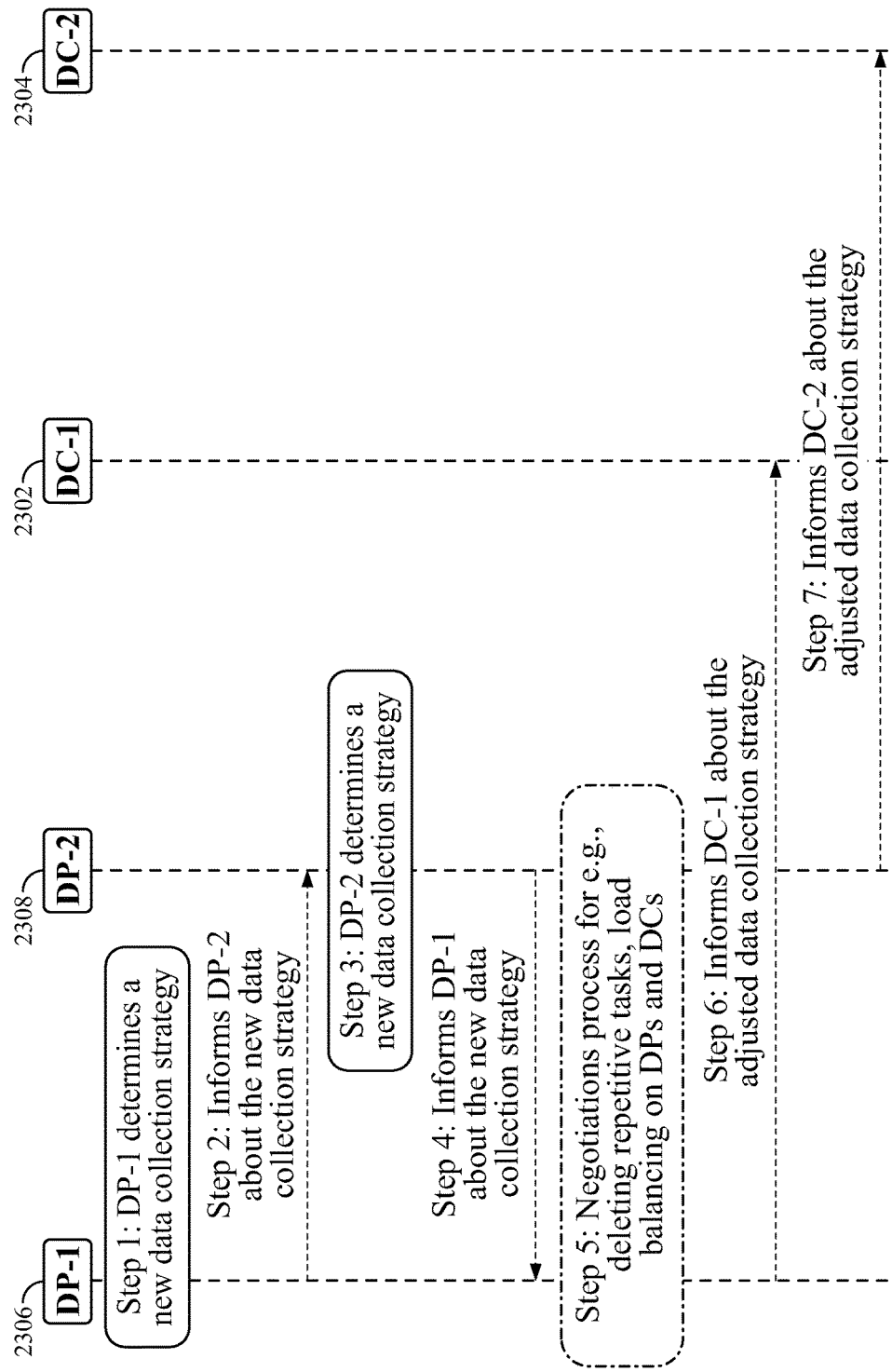
FIG. 24 is a flow chart that illustrates two DPs collaborating on the data collection process.

FIG. 24 is a flow chart that illustrates two DPs 2306 and 2308 collaborating on the data collection process. As shown in FIG. 24, when DP-1 2306 and DP-2 2308 both have a new data collection strategy, instead of directly sending those data collection strategies to DCs 2302 and 2304, the two DPs 2306 and 2308 first exchange their data collection strategy and conduct a negotiation process. The potential benefits of such a negotiation process are as follows: 1) the two DPs 2302 and 2309 may have the same data collection tasks, which could be detected and merged during the negotiation process; 2) different DPs may have different amount of available computing resources, therefore, the node availability estimation tasks may be balanced between them; 3) Similarly, since different DCs may also have different workload for data collection, DPs may also balance the workloads on different DCs by adjusting their data collection strategies. 4) If two data collection strategies are going to collect different type of data for the same interested node, combining those data collection tasks together and sending all the data to one DP 2306 for processing may significantly improve the accuracy of the estimation result. Finally, based on the negotiation process as shown in Step 5, the DP-1 2306 and DP-2 2308 will send their adjusted data collection strategies to DC-1 2302 and DC-2 2304 (which is just an example), respectively.

It is understood that the entities performing the steps illustrated in FIG. 24 are logical entities that may be implemented in the form of software (i.e., computer-executable instructions) stored in a memory of, and executing on a processor of, a network node or computer system such as those illustrated in FIG. 32C or FIG. 32D. That is, the method(s) illustrated in FIG. 24 may be implemented in the form of software (i.e., computer-executable instructions) stored in a memory of a network node, such as the node or computer system illustrated in FIG. 32C or FIG. 32D, which computer executable instructions, when executed by a processor of the node, perform the steps illustrated in FIG. 24. It is also understood that any transmitting and receiving steps illustrated in FIG. 24 may be performed by communication circuitry of the node under control of the processor of the node and the computer-executable instructions (e.g., software) that it executes.

Figure 25:
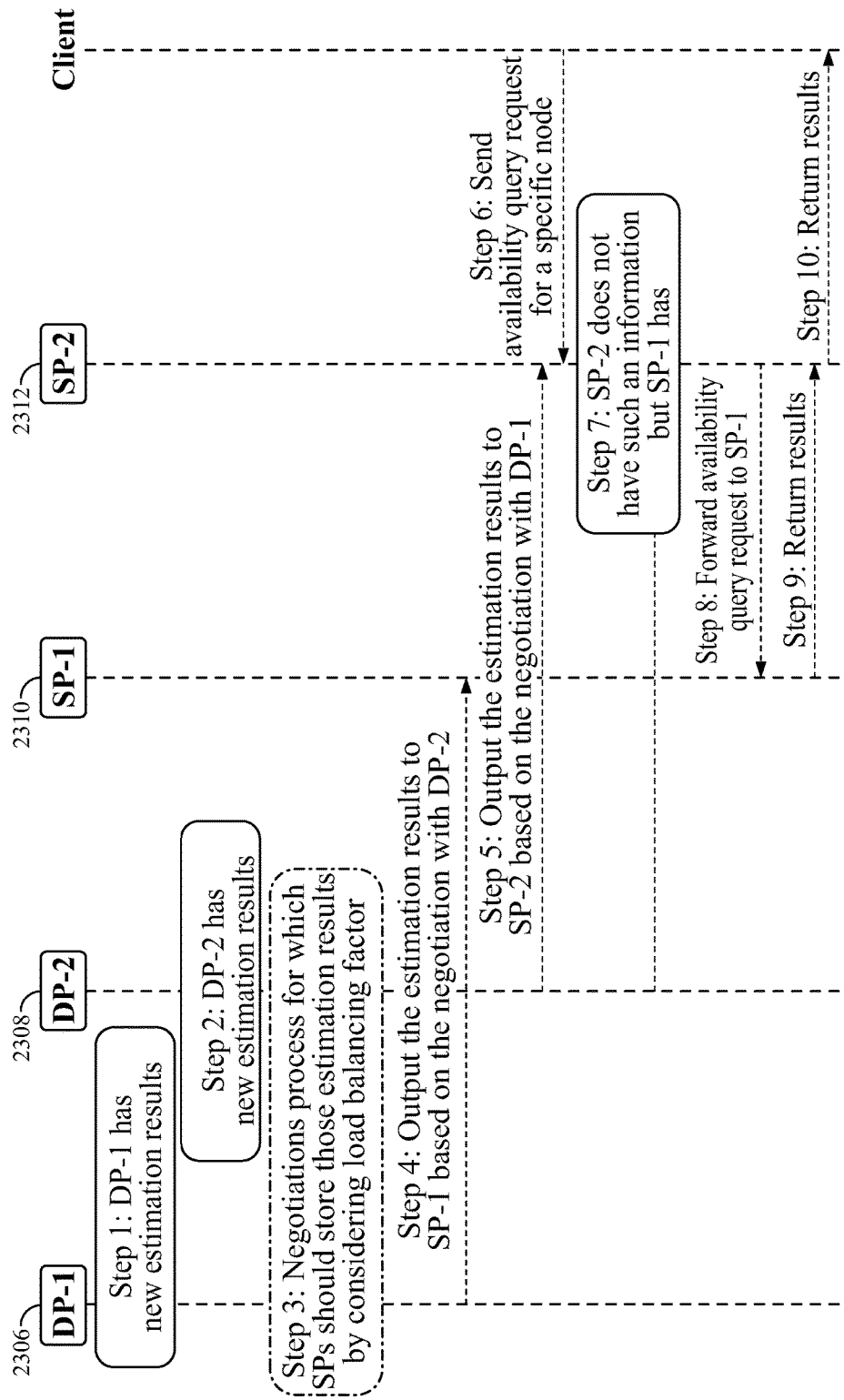
FIG. 25 is a flow chart that illustrates two DPs collaborating on the service provisioning process and two SPs sharing information between each other.

FIG. 25 is a flow chart that illustrates two DPs 2306 and 2308 collaborating on the service provisioning process and SPs 2310 and 2312 sharing information between each other. As shown in FIG. 25, when DP-1 2306 and DP-2 2308 have new estimation results, instead of directly outputting the results to SPs 2310 and 2312, the two DPs 2306 and 2308 first executes a negotiation process, during which they will determine which estimation results will be stored at which SPs 2310 and 2312 by considering the load balancing issues at different SPs or other factors for example. Accordingly, DP-1 2306 and DP-2 2308 will output their results to corresponding SPs (SP-1 2310 and SP-2 2312 for example shown in the figure) based on the negotiation process. Note that, there is also collaboration between different SPs 2310 and 2312 in terms of information sharing, because different SPs may store different pieces of node availability information. As a result, when a client sends an availability query for a specific node to SP-2 2312, it is possible that SP-2 2312 does not have such information but SP-1 2310 may have. Then, SP-2 2312 will forward this request to SP-1 2310, and finally SP-1 2310 could provide the availability information required by the client, by sharing this information to SP-2 2312.

It is understood that the entities performing the steps illustrated in FIG. 25 are logical entities that may be implemented in the form of software (i.e., computer-executable instructions) stored in a memory of, and executing on a processor of, a network node or computer system such as those illustrated in FIG. 32C or FIG. 32D. That is, the method(s) illustrated in FIG. 25 may be implemented in the form of software (i.e., computer-executable instructions) stored in a memory of a network node, such as the node or computer system illustrated in FIG. 32C or FIG. 32D, which computer executable instructions, when executed by a processor of the node, perform the steps illustrated in FIG. 25. It is also understood that any transmitting and receiving steps illustrated in FIG. 25 may be performed by communication circuitry of the node under control of the processor of the node and the computer-executable instructions (e.g., software) that it executes.

Figure 26A:
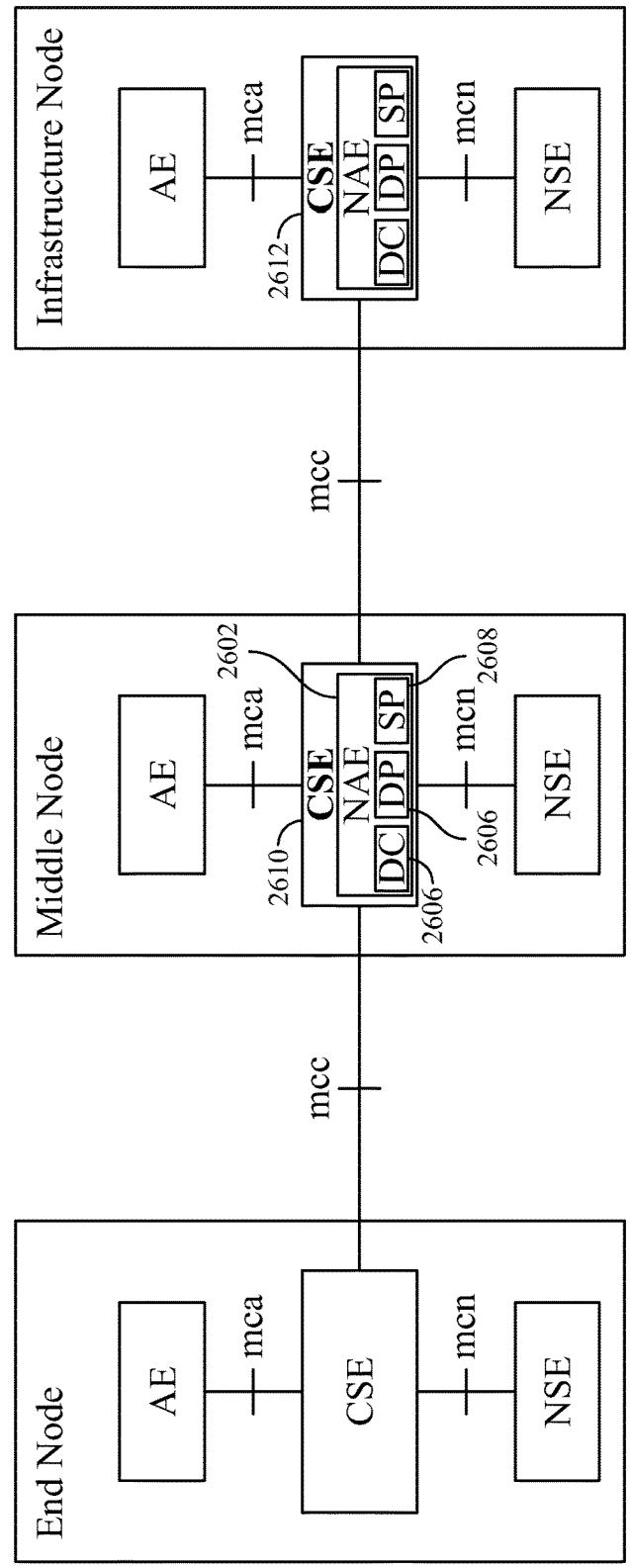
FIGS. 26A-B are diagrams that illustrate exemplary embodiments for enhancing the existing oneM2M functional architecture to support the NAE service.
Figure 26B:
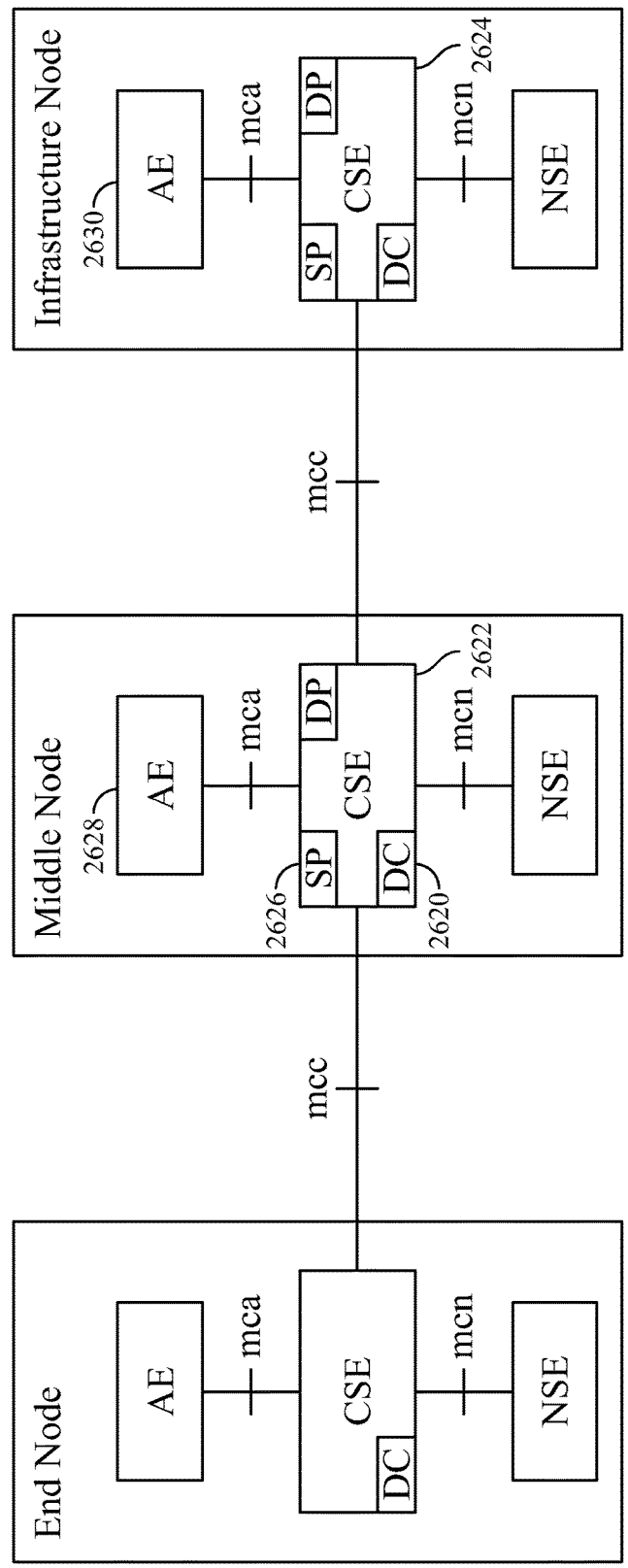

FIGS. 26A-B are diagrams that illustrate exemplary embodiments for enhancing the existing oneM2M functional architecture to support the NAE service. As shown in FIGS. 26A-B, NAE can be a new CSF in CSE. Two options are described for deploying NAE.

On one hand, if the NAE 2602 is deployed in a centralized way (i.e, all three components of NAE 2602 in terms of DC 2604, DP 2606 and SP 2608 are implemented in a single node within CSE 2610, as show in FIG. 26A CSE 2610 could either a MN-CSE or an IN-CSE. In particular, considering the computing resource needed for estimating node availability executed at DP 2606 component of NAE 2602, putting NAE 2602 within an IN-CSE may be a desirable choice. The intra and inter communications of NAE 2602 are described as follows:

When NAE (provided by CSE-1) needs to communicate with another CSF provided by a different CSE 2612 (say CSE-2), it will go through mcc interface. For example, it may have the following cases:

Case-1: If it is related to the procedure for data collection relationship and policy establishment as discussed with respect to FIG. 11, the involved objects are DC and a data source, and the structure of the message to be exchanged between them is shown in FIG. 12.

Case-2: If it is related to the procedure for data collecting and reporting in FIG. 13, the involved objects are also DC and a data source, and the structure of the message to be exchanged between them is shown in FIG. 14.

Case-3: If it is related to procedure for data collection relationship and policy updating as discussed in FIG. 15, the involved objects are DC and a data source, and the structure of the message to be exchanged between them is shown in FIG. 12 plus the dataCollectionRelationshipID as discussed in the Step 4 of FIG. 15.

Case-4: If it is related to procedure for service provisioning as discussed in FIG. 18 of Sec. 5.4, the involved objects are SP and a CSE client, and the structures of the message to be exchanged between them are discussed in the Step 2 of in FIG. 18 (related to the query message) and the structure defined in FIG. 19 (related to the response message).

When NAE 2606 needs to communicate with a CSF provided by the same CSE 2610, or when the three components within NAE 2602 need to interact with each other, the communications will go through mff interface, which designates communications between different service functions within the same Service Layer.

When the NAE 2602 service (provided by CSE-1 2610) is queried by an AE sitting on the same CSE-1 2610, it will go through mac interface. It is mainly related to the procedure for service provisioning as discussed with respect to FIG. 18, but the involved objects are SP and an AE client (instead of a CSE in Case-4 as mentioned above). The structures of the message to be exchanged between them are as same as the ones shown in Case-4.

On the other hand, NAE could also be deployed in a distributed way (as show in FIG. 26B), in the sense that its three essential components (DC, DP and SP) could reside within different nodes and may also have interaction among multiple DCs, DPs and SPs as discussed in Sec. 5.6. For example, the DC can be on all the nodes including the end nodes while DP and SP could be deployed on MN-CSE and In-CSE (the reason is similar with one as mentioned before). The intra and inter communications of NAE are described as follows:

When DC 2620 (deployed at CSE-1 2622) needs to communicate with another CSF (for data collection at DC of NAE) provided by a different CSE (say CSE-2 2624), it will go through mcc interface. The four cases (Case-1 to Case-4) as shown before is also applied related to the related objects and the structures of the messages to be exchanged.

When DC 2620 (deployed at CSE-1 2622) needs to communicate with another CSF provided by the same CSE, it will go through mff interface. The four cases (Case-1 to Case-4) as shown before are still applied on the mff interface.

When SP 2626 (deployed by CSE-1 2622) is queried by an AE 2628 sitting on the same CSE-1 2622, it will go through mac interface. It is mainly related to the procedure for service provisioning as discussed with respect to FIG. 18, and the involved objects are SP 2626 and an AE 2628 client. The structures of the message to be exchanged between them are as same as the one shown in Case-4.

When SP 2626 (deployed by CSE-1 2632) is queried by an AE 2630 sitting on another CSE-2 2624, it will go through both mcc and mac interface. Again, it is related to service provisioning and the structures of the message to be exchanged between them are as same as the one shown in Case-4.

For communications between any two components of NAE (i.e., DC, DP and SP), they will go through mff interface if they are deployed at the same CSE, Otherwise, they will go through mcc interface. For example, for interactions between DC and DP, the structures of messages between them can be similar with the one shown in FIG. 12 (which is used when DC inputs the collected data to DP) and the message elements which are used when DP sends the data collection strategy to DC.

It is understood that the functionality illustrated in FIGS. 26A-B, may be implemented in the form of software (i.e., computer-executable instructions) stored in a memory of, and executing on a processor of, a node of an M2M network (e.g., a server, gateway, device, or other computer system), such as one of those illustrated in FIG. 32C or 32D described below.

Figure 27:
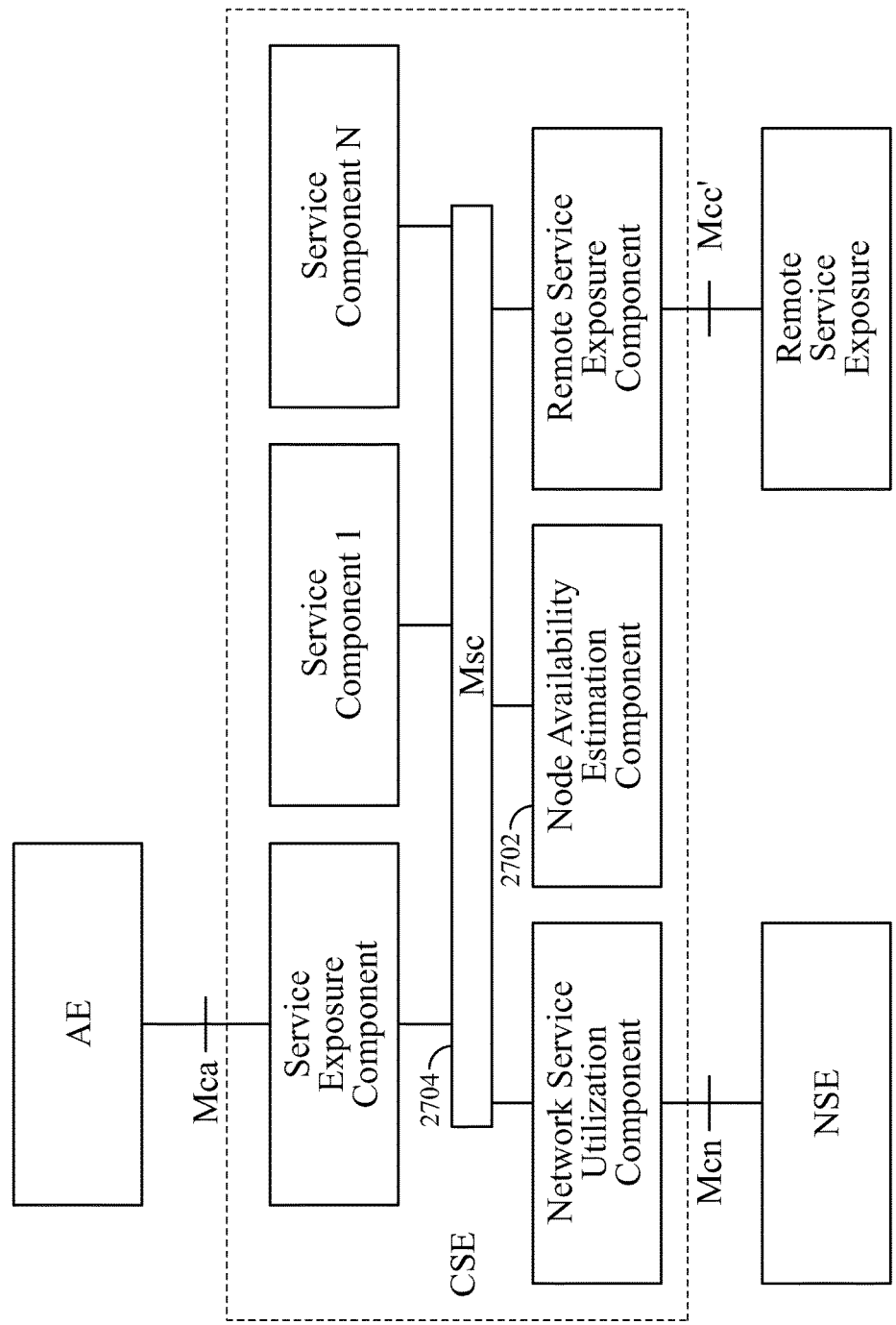
FIG. 27 is a diagram that illustrates implementation architecture of NAE in the oneM2M Service Component Architecture.

FIG. 27 is a diagram that illustrates implementation architecture of NAE 2702 in the oneM2M Service Component Architecture. As shown in the figure, NAE 2702 could be implemented by inserting an individual service component called 'Node Availability Estimation Component' 2702, which could be interacted with other components over 'Msc' reference point 2704.

It is understood that the functionality illustrated in FIG. 27, may be implemented in the form of software (i.e., computer-executable instructions) stored in a memory of, and executing on a processor of, a node of an M2M network (e.g., a server, gateway, device, or other computer system), such as one of those illustrated in FIG. 32C or 32D described below.

FIG. 28 is a diagram that shows exemplary data collection, processing and node availability service provisioning embodiments of NAE 2702 at a oneM2M Service Layer. The DC collects real-time data from input sources. In the context of oneM2M domain, those entities could be existing CSFs. In particular, since many existing CSFs are exposed as resources, FIG. 28 shows which specific resources NAE can collect real-time data from, according to the latest oneM2M functional architectural specification. In particular, FIG. 28 is the concrete embodiment of the data reporting message (as defined in FIG. 14) by illustrating how to collect data from existing CSFs at oneM2M service layer. For example, when NAE needs to collect data from CMDH CSF (which is represented as a <delivery> resource in oneM2M service layer), it can collect data regarding to a CSE or an AE. Regarding to the interested data, "source" and "target" indicate who are involved in such a <delivery> resource (Clearly, one of them should be the interested node), "lifespan" shows the duration of the delivery and "deliveryMetaData" indicates the delivery status, etc. Similarly, NAE could collect data from the <node> resource. The corresponding interested node could be a physical node and the interested data could include the "memory usage", "storage", "power", and "sleep schedule" (described by a <schedule> resource, which is another type of resources that NAE can collect data from) of the node.

Figure 29:
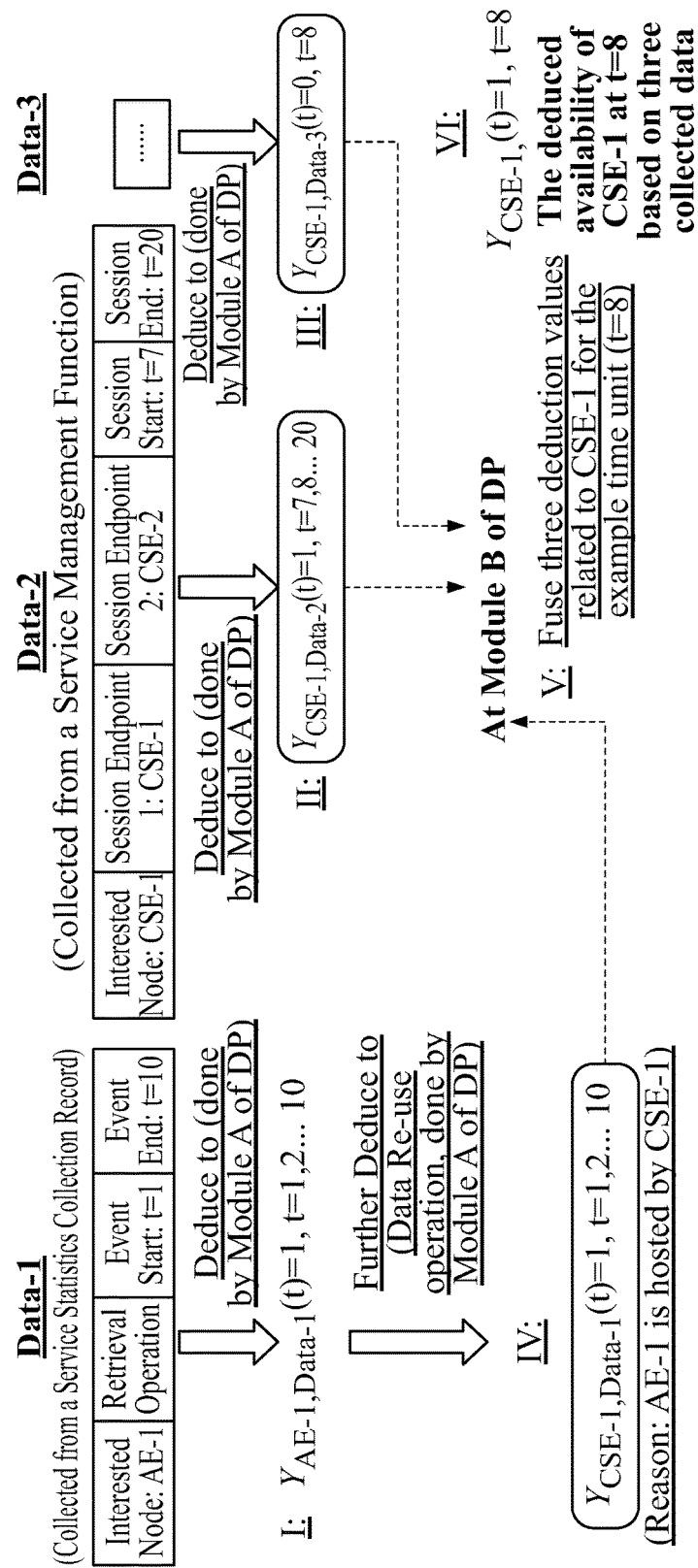
FIG. 29 is a diagram that illustrates an exemplary data processing embodiment at a oneM2M Service Layer.

FIG. 29 is a diagram that illustrates an exemplary data processing embodiment at a oneM2M Service Layer. DP can estimate node availability based on the collected data from DC. FIG. 29 shows an embodiment on 1) how to deduce node availability information from three different pieces of data (done at Module A of DP) and 2) how to fuse information abstracted from three data (done at Module B of DP). As shown in FIG. 29, DC has received three data from different sources. For example, Data-1 is about AE-1 (i.e., the interested node) and is collected from a Service Statistics Collection Record. Data-2 is about CSE-1 (i.e., the interested node) and is collected from a Session Management Function.

For an interested node i (which could be AE-1 or CSE-1 in this example) and each of its related data j (i.e., Data-1 for AE-1, Data-2 and Data-3 for CSE-1), Module A will execute a deduction process and each element data will be deduced to either a "0" or "1" value for the variable $y_{i,j}(t)$, which is a Boolean variable to indicate the availability of node i at time unit t, only based on the information abstracted the data j. The deduction results are shown in Segments I, II, and III in the FIG. 29. For example, based on Data-1, it is deduced that $y_{AE-1,Data-1}(t)=1$ for the time units between t=1 and t=10. Based on Data-2, it is deduced that $y_{CSE-1,Data-2}(t)=1$ for the time units between t=7 and t=20. Based on Data-3, it is deduced that $y_{CSE-1,Data-3}(t)=1$ only for time unit t=8. In particular, from $y_{AE-1,Data-1}(t)=1$, Module A will further deduce that $y_{CSE-1,Data-1}(t)=1$ for the time units between t=1 and t=10. This is the data re-use process as mentioned above in the sense that a given information directly related to node i may also indirectly reflect the availability of other related nodes. As an example, since AE-1 is available during [t=1, t=10] and AE-1 is in fact held by CSE-1, therefore, it also can be deduced that CSE-1 is also available during [t=1, t=10] (which is shown in Segment IV in the FIG. 29).

Next, for the time being, the focus is only on CSE-1 and the focused time unit is only for t=8. Since there are three deduction results related to the availability of CSE-1 at time unit t=8, those three deduction results will be fused at Module B of DP (i.e., Segment V in FIG. 29) and the fused node availability result (i.e., $y_i(t)$) is shown in Segment VI.

Figure 30A:
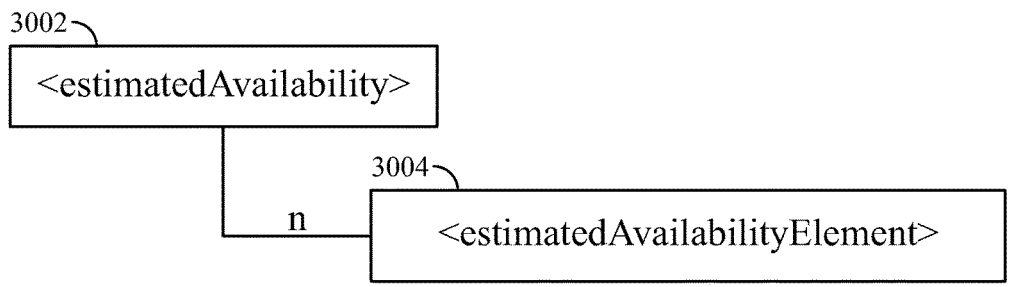
FIGS. 30A and 30B are diagrams that illustrate exemplary resources that can be used in embodiments.
Figure 30B:
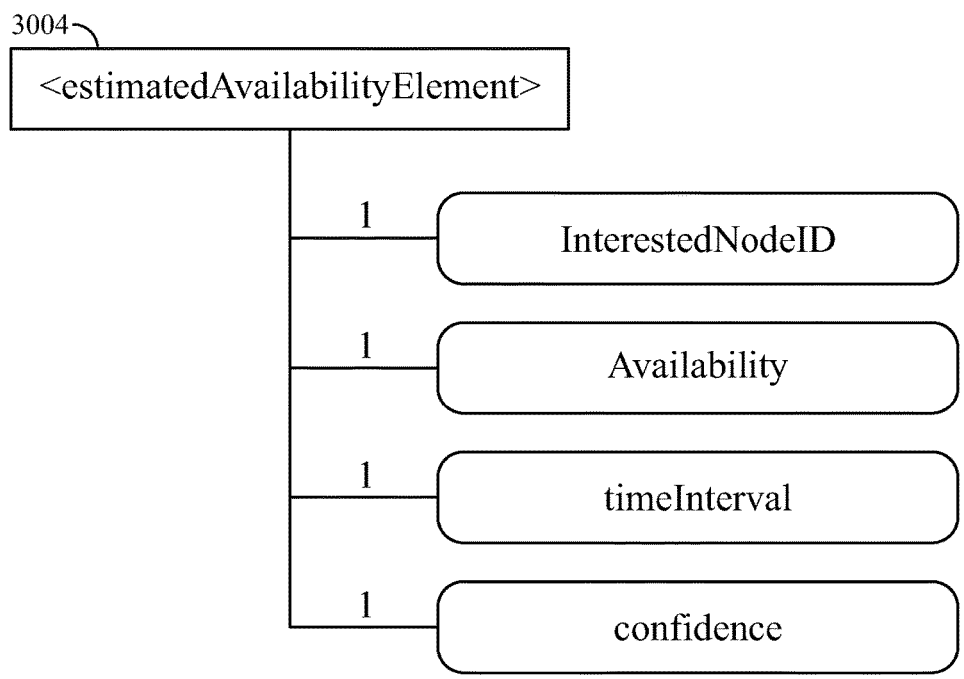

FIGS. 30A and 30B are diagrams that illustrate exemplary resources that can be used in embodiments. These resources can be read to the provisioning node availability estimation service at SP, FIG. 30A shows the resource <estimatedAvailability> 3002; and FIG. 30B shows the resource <estimatedAvailabilityElement> 3004. Typically, <estimatedAvailability> 3002 could sit under the resource <CSEBase>. In the meantime the <estimatedAvailability> 3002 itself could include a number of child <estimatedAvailabilityElement> 3004 resources. In particular, each <estimatedAvailabilityElement> 3004 resource is to represent one estimated node availability result and the attributes of this resource correspond to data elements as listed in Eq. (10). Alternatively, the estimated node availability result could also be stored in the existing <schedule> resource by adding a new attribute e.g., confidence, etc.

Interfaces, such as Graphical User Interfaces (GUIs), can be used to assist user to control and/or configure functionalities related to Node Availability Estimation Service at Service Layer. FIG. 31 is a diagram that illustrates an interface 3102. It is to be understood that interface 3102 can be produced using displays such as those shown in FIGS. 32C-D described below.

As discussed the general architecture inside the DP, Module D, as shown in FIG. 16, is used to build the node availability estimator (i.e., the function $f_i(t)$) in the sense that given a number of historical availability information (i.e., $L_i(t, k)$ as discussed in the previous section), Module D is to determine the values for those parameters (i.e., $a_n$, $a_{n-1}$, . . . $a_1$, $a_0$) of function $f_i(t)$.

It is worth noting that any available solution can be used as plug-in for building the estimator (In other words, this disclosure does not limit to any specific approach for implementing Module D). Therefore, for any plug-in solution, users may need to conduct some configurations before starting to build the estimator. Therefore, in order to provide a convenient way for user to configure e.g., which basic function $f_i(t)$ to be used, and how to set the initial values of the parameters (i.e., $a_n$, $a_{n-1}$, . . . $a_1$, $a_0$) of function $f_i(t)$, a user control panel in term of a Graphical User Interface (GUI) could be provided. FIG. 31 shows an example GUI 3102 to allow user to choose which basic function $f_i(t)$ to be used, as well as the initial values of its parameters, which can be easily extended based on needs.

Example M2M/IoT/WoT Communication System

FIG. 32A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as Node Availability Estimator 902, DC 904, DP 906 and/or SP 908 as well as logical entities to produce the Graphical User Interface 3102.

As shown in FIG. 32A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 32A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 32B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as Node Availability Estimator 902, DC 904, DP 906 and/or SP 908 as well as logical entities to produce the Graphical User Interface 3102. The M2M service layer 22 may be implemented by one or more servers, computers, devices, virtual machines (e.g. cloud/storage farms, etc.) or the like, including for example the devices illustrated in FIGS. 32C and 32D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 32B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as Node Availability Estimator 902, DC 904, DP 906 and/or SP 908 as well as logical entities to produce the Graphical User Interface 3102 may be hosted within a M2M service layer instance hosted by an M2M node, such as an M2M server, M2M gateway, or M2M device, as shown in FIG. 32B. For example, the logical entities such as Node Availability Estimator 902, DC 904, DP 906 and/or SP 908 as well as logical entities to produce the Graphical User Interface 3102 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 32C or FIG. 32D described below.

Further, logical entities of the present application such as Node Availability Estimator 902, DC 904, DP 906 and/or SP 908 as well as logical entities to produce the Graphical User Interface 3102 can implemented as part of an M2M network that uses a Service Oriented Architecture (SOA) and/or a Resource-Oriented Architecture (ROA) to access services of the present application.

FIG. 32C is a block diagram of an example hardware/software architecture of a M2M network node 30, such as an M2M device 18, an M2M gateway 14, an M2M server, or the like. The node 30 can execute or include logical entities such as Node Availability Estimator 902, DC 904, DP 906 and/or SP 908 as well as logical entities to produce the Graphical User Interface 3102. The device 30 can be part of an M2M network as shown in FIG. 32A-B or part of a non-M2M network. As shown in FIG. 32C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 32C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 32C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 32C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 32D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as Node Availability Estimator 902, DC 904, DP 906 and/or SP 908 as well as logical entities to produce the Graphical User Interface 3102. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 32A and FIG. 32B, to enable the computing system 90 to communicate with other nodes of the network.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as Node Availability Estimator 902, DC 904, DP 906 and/or SP 908 as well as logical entities to produce the Graphical User Interface 3102 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus comprising a processor and a memory, the apparatus further including computer-executable instructions stored in the memory of the apparatus which, when executed by the processor of the apparatus, cause the apparatus to:
   receive past history data from a data collection module concerning a node of a communications network;
   estimate if the node will be up or down at a certain time using the past history data; and
   provide the estimate to a node availability service provisioning module of the apparatus, wherein the node availability service provisioning module is configured to provide the estimate to clients as node availability estimation services.

2. The apparatus of claim 1, wherein the receiving, estimating, and providing operations are done at a data processing module.

3. The apparatus of claim 1, wherein an estimator model is generated to estimate whether the node will be up or down at a certain time.

4. The apparatus of claim 3, wherein the estimator model is evaluated for accuracy.

5. The apparatus of claim 4, wherein the evaluation is used to create a new data collection strategy.

6. The apparatus of claim 1, wherein the node is a physical node.

7. The apparatus of claim 1, wherein the node is a logical node.

8. A method performed by an apparatus, wherein the apparatus comprises a processor and memory, and wherein the apparatus further includes computer-executable instructions stored in the memory which, when executed by the processor, perform functions of a method comprising:
   receiving past history data from a data collection module concerning a node of a communications network;
   estimating if the node will be up or down at a certain time using the past history data; and
   providing the estimate to a node availability service provisioning module of the apparatus, wherein the node availability service provisioning module is configured to provide the estimate to clients as node availability estimation services.

9. The method of claim 8, wherein the receiving, estimating, and providing operations are done at a data processing module.

10. The method of claim 8, wherein an estimator model is generated to estimate whether the node will be up or down at a certain time.

11. The method of claim 10, wherein the estimator model is evaluated for accuracy.

12. The method of claim 11, wherein the evaluation is used to create a new data collection strategy.

13. The method of claim 8, wherein the node is a physical node.

14. The method of claim 8, wherein the node is a logical node.

15. A non-transitory computer-readable storage medium comprising computer-executable instructions which, when executed by a processor of an apparatus, cause the apparatus to perform operations comprising:
  receive past history data from a data collection module concerning a node of a communications network;
  estimate if the node will be up or down at a certain time using the past history data; and
  provide the estimate to a node availability service provisioning module of the apparatus, wherein the node availability service provisioning module is configured to provide the estimate to clients as node availability estimation services.

16. The non-transitory computer-readable storage medium of claim 15, wherein the receiving, estimating, and providing operations are done at a data processing module.

17. The non-transitory computer-readable storage medium of claim 15, wherein an estimator model is generated to estimate whether the node will be up or down at a certain time.

18. The non-transitory computer-readable storage medium of claim 17, wherein the estimator model is evaluated for accuracy.

19. The non-transitory computer-readable storage medium of claim 18, wherein the evaluation is used to create a new data collection strategy.

20. The non-transitory computer-readable storage medium of claim 15, wherein the node is one of a physical node or a logical node.

\* \* \* \* \*